US012618693B2

(12) United States Patent (10) Patent No.: US 12,618,693 B2
Houda et al. (45) Date of Patent: May 5, 2026

(54) MULTI-ROTATION ANGLE DETECTION DEVICE

(71) Applicant: ORIENTAL MOTOR CO., LTD., Tokyo (JP)

(72) Inventors: Akihiko Houda, Tsukuba (JP); Masayuki Someya, Tsukuba (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/123,678

(22) PCT Filed: Oct. 11, 2023

(86) PCT No.: PCT/JP2023/036927
§ 371 (c)(1),
(2) Date: Apr. 23, 2025

(87) PCT Pub. No.: WO2024/090209
PCT Pub. Date: May 2, 2024

(65) Prior Publication Data
US 2026/0009657 A1 Jan. 8, 2026

(30) Foreign Application Priority Data
Oct. 25, 2022 (JP) ................................ 2022-170648

(51) Int. Cl.
*G01B 7/14* (2006.01)
*G01B 7/30* (2006.01)
*G01D 5/20* (2006.01)

(52) U.S. Cl.
CPC ................. *G01D 5/20* (2013.01); *G01B 7/30* (2013.01)

(58) Field of Classification Search
CPC .. G01D 5/12; G01D 5/14; G01D 5/16; G01D 5/20; G01D 5/145; G01D 5/147;
(Continued)

(56) References Cited

U.S. PATENT DOCUMENTS

2003/0122542 A1 7/2003 Koga et al.
2006/0164077 A1 7/2006 Mehnert et al.
(Continued)

FOREIGN PATENT DOCUMENTS

CN 1432789 A 7/2003
CN 101584116 A 11/2009
(Continued)

OTHER PUBLICATIONS

International Preliminary Report on Patentability dated May 8, 2025, and its English Translation issued by the International Bureau in PCT/JP2023/036927.

*Primary Examiner* — Thang X Le
(74) *Attorney, Agent, or Firm* — Rabin & Berdo, P.C.

(57) ABSTRACT

A multiturn angle detection device generates the multiturn absolute angle detection value of a rotating body. The multiturn angle detection device includes: a segment counter; a precision absolute angle detector; and an arithmetic device to generate the multiturn absolute angle detection value by combining the outputs of the segment counter and the precision absolute angle detector with each other. The segment counter includes: a single power generation sensor; a magnetic field generation source; a sensor element; and a nonvolatile memory to store a count value. The magnetic field generation source applies a k-cycle alternating magnetic field (wherein k is an integer not smaller than 3) per each turn of the rotating body axially of a magnetic wire. The arithmetic device uses the count value stored in the nonvolatile memory as it is, and combines the count value with the absolute angle detection value of the precision absolute angle detector.

6 Claims, 13 Drawing Sheets

(58) Field of Classification Search
CPC .... G01D 5/165; G01D 5/2457; G01D 5/2013;
G01D 5/2046; G01D 5/24476; G01D
5/245; G01R 33/025; G01R 33/07; G01R
33/0206; G01R 33/06; G01R 33/063;
G01R 33/09; G01R 33/093; G01R
33/0052; G01R 33/18; G01N 27/9033;
G01N 27/902; G01N 27/9013; G01N
27/904; G01N 27/223; G01N 27/82;
G01N 27/9093
See application file for complete search history.

(56) References Cited

U.S. PATENT DOCUMENTS

| | | | | |
|---|---|---|---|---|
| 2010/0066352 | A1* | 3/2010 | Takahashi | F16C 33/723 |
| | | | | 324/207.25 |
| 2011/0006757 | A1 | 1/2011 | Mehnert et al. | |
| 2011/0192087 | A1 | 8/2011 | Tategami | |
| 2012/0268109 | A1 | 10/2012 | Mehnert et al. | |
| 2015/0015245 | A1 | 1/2015 | Inoue et al. | |
| 2018/0231399 | A1* | 8/2018 | Okumura | G01B 7/30 |
| 2018/0340799 | A1 | 11/2018 | Goto | |
| 2020/0039579 | A1* | 2/2020 | Fujita | G01D 5/145 |
| 2024/0183648 | A1* | 6/2024 | Volker | G01D 5/145 |

FOREIGN PATENT DOCUMENTS

| | | |
|---|---|---|
| CN | 101999079 A | 3/2011 |
| CN | 104246444 A | 12/2014 |
| CN | 108426588 A | 8/2018 |
| CN | 114270673 A | 4/2022 |
| JP | 2006-523822 A | 10/2006 |
| JP | 2008014799 A | 1/2008 |
| JP | 5730809 B2 | 6/2015 |
| JP | 6226811 B2 | 11/2017 |
| JP | 2021-012212 A | 2/2021 |
| JP | 2022-079329 A | 5/2022 |

* cited by examiner

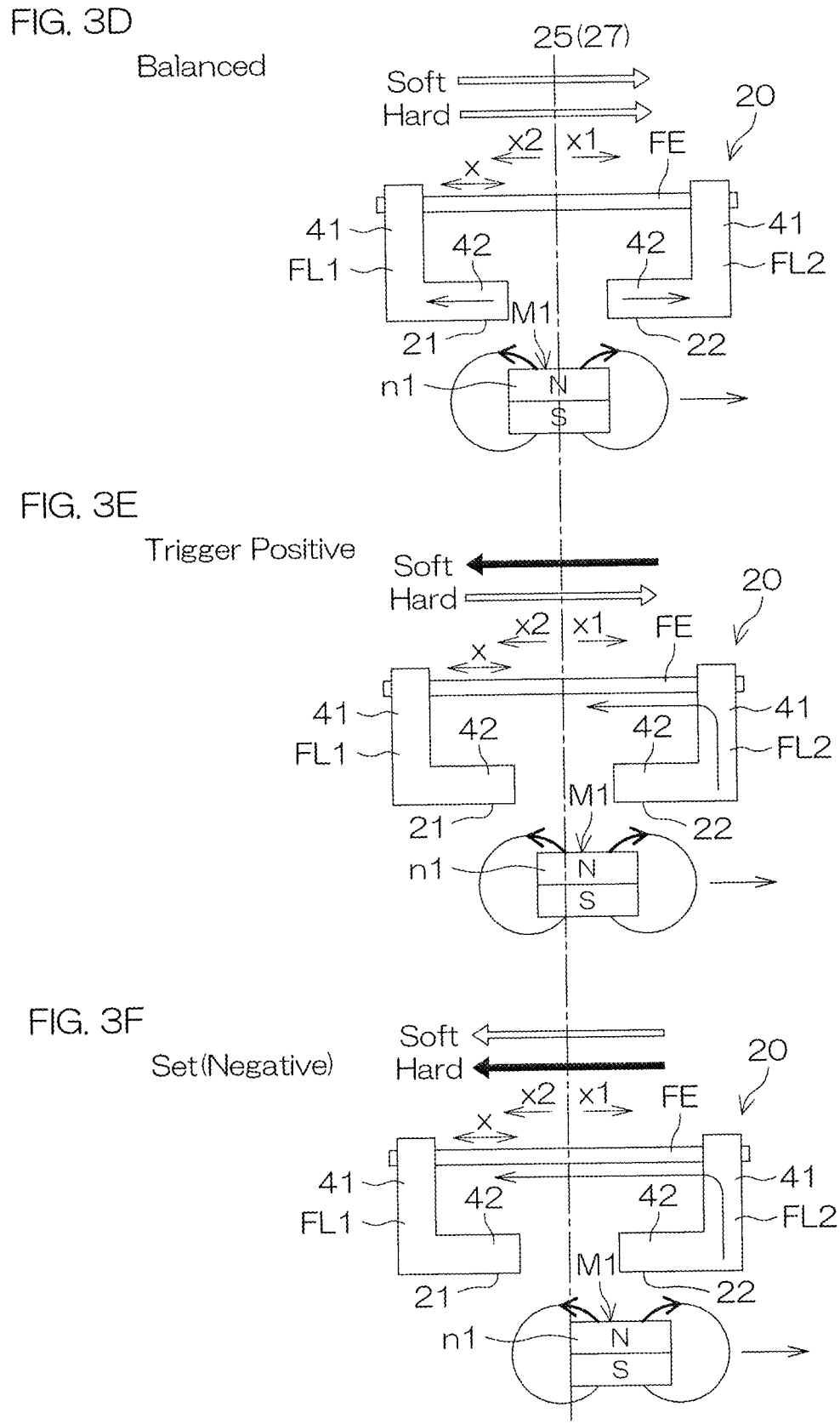

FIG. 5

| NEW | OLD | Count |
|-----|-----|-------|
| HP | HN | +1 |
|    | LP | +1 |
|    | LN | +1 |
| HN | HP | −1 |
|    | LP | −1 |
|    | LN | −1 |
| LP | HP | −1 |
| LN | HN | +1 |
| others | | 0 |

Initial State
(Balanced)

Trigger Negative

Set (Positive)

Balanced

Trigger Positive

Set(Negative)

MULTI-ROTATION ANGLE DETECTION DEVICE

RELATED APPLICATION

This application claims the benefit of priority to Japanese Patent Application No. 2022-170648, filed on Oct. 25, 2022, the disclosure of which is entirely incorporated herein by reference.

TECHNICAL FIELD

The present invention relates to a multiturn angle detection device employing a power generation sensor. More specifically, the present invention relates to a device that detects a multiturn absolute angle over a single turn by combining the count value of a segment counter employing the power generation sensor with an angle detection value obtained: n angle detector capable of precisely detecting an absolute angle based on a single turn cycle.

BACKGROUND ART

Magnetic wires having a large Barkhausen effect (large Barkhausen jump) are known in the name of Wiegand wire or pulse wire. Such a magnetic wire includes a core portion, and a shell portion provided around the core portion. One of the core portion and the shell portion is a soft (magnetically soft) layer in which its magnetization direction is reversed even by application of a weak magnetic field, and the other of the core portion and the shell portion is a hard (magnetically hard) layer in which its magnetization direction is reversed only by application of a strong magnetic field. A power generation sensor is produced by winding a coil around the magnetic wire.

When the hard layer and the soft layer are magnetized in the same direction axially of the wire and the strength of an external magnetic field applied in a direction opposite to that magnetization direction is increased to a certain magnetic field strength, the magnetization direction of the soft layer is reversed. The reversal of the magnetization direction starts at a certain position of the magnetic wire to propagate to the entire wire, whereby the magnetization direction of the soft layer is totally reversed. At this time, the large Barkhausen effect is exhibited to induce a pulse signal in the coil wound around the magnetic wire. When the external magnetic field strength is further increased to another certain magnetic field strength, the magnetization direction of the hard layer is reversed.

The magnetic field strength at which the magnetization direction of the soft layer is reversed is herein referred to as "operational magnetic field" and the magnetic field strength at which the magnetization direction of the hard layer is reversed is herein referred to as "stabilization magnetic field."

A voltage outputted from the coil is characteristically constant irrespective of the change rate of an input magnetic field (external magnetic field), and is free from chattering because of its hysteresis with respect to the input magnetic field. For this reason, the pulse signal outputted from the coil is used in a position detection device and the like.

Where an alternating magnetic field is applied to the power generation sensor, two pulse signals including one positive pulse signal and one negative pulse signal are generated per each cycle. Magnets are used as a magnetic field generation source, and the alternating magnetic field is applied to the power generation sensor by relative movement of the magnets and the power generation sensor. Thus, a position can be detected by counting generated pulse signals.

Since the output from the coil has electric power, a sensor of power generation type (power generation sensor) requiring no external electric power supply can be provided. That is, a peripheral circuit can also be operated by an energy outputted from the coil without the external electric power supply.

An angle sensor such as an absolute encoder is intrinsically incapable of detecting an angle over a single turn. As long as the electric power is supplied, an angle of one or more turns can be detected by summing up movement amounts. If the power supply is cut however, information about the one or more turns is lost.

On the other hand, a segment counter employing the power generation sensor can utilize the energy outputted from the coil even if the external electric power supply is cut off. Therefore, the segment counter can continue the counting to detect one or more turns or multiple turns. In general, however, the segment counter employing the power generation sensor can only roughly detect the angle. Where the segment counter is used for motor control requiring precise angle detection, therefore, a precise multiturn angle detection value (multiturn absolute angle detection value) is utilized, which is determined by combining the count value of the segment counter with the angle detection value of a separate precision absolute angle detector.

PTL 1 and PTL 2 disclose methods and devices each adapted to combine the count value of the segment counter with the angle detection value of the precision absolute angle detector.

PTL 1 utilizes a segment counter including three power generation sensors disposed at positions with a phase difference of 60 degrees.

When the direction of the movement of a rotating body is changed, the movement direction cannot be determined only based on the output of a single power generation sensor. Where a plurality of power generation sensors are used, therefore, the movement direction can be determined by using phase differences among the outputs of the respective power generation sensors.

In order to output a voltage pulse from each of the power generation sensors, it is necessary to reverse the magnetization direction of only the soft layer from a state such that the magnetization directions of the hard layer and the soft layer of the magnetic wire are consistent. Even if the magnetization direction of only the soft layer is reversed in a state such that the magnetization directions of the hard layer and the soft layer are inconsistent, no pulse signal is generated or a pulse signal having a very small amplitude is generated.

Where the rotating body is continuously rotated in one direction, the magnetic field reaches the stabilization magnetic field at a certain timing after reaching the operational magnetic field to output a voltage pulse before reaching the operational magnetic field again. Therefore, a voltage pulse is certainly generated at an angle position at which the operational magnetic field is reached.

Where the rotating body is rotated in both directions (i.e., the rotation direction is changed), however, the power generation sensor is liable to fail to output a voltage pulse (i.e., so-called pulse missing is liable to occur) even if the operational magnetic field is reached. Specifically, no voltage pulse is outputted, even if the magnetic field reaches the operational magnetic field again with the rotation direction reversed before reaching the stabilization magnetic field after reaching the operational magnetic field to output a voltage pulse. This is because the magnetization directions of the hard layer and the soft layer are inconsistent.

With the provision of the plurality of power generation sensors at the positions with a phase difference, the rotation direction can be determined by using the phase differences among the output pulses of the power generation sensors. Even with the use of two power generation sensors, however, the rotation direction cannot be determined, if the pulse missing occurs in either of the power generation sensors. Therefore, as disclosed in PTL 1, it is necessary to use the three power generation sensors. In PTL 1, the three power generation sensors are arranged with a phase difference of 60 degrees to combine the count value of the segment counter with the detection value of the precision position detector and to correct an offset of the origin.

However, the use of the plurality of power generation sensors increases the size and the costs of the position detector.

PTL 2 discloses a segment counter that determines a rotation direction by processing the pulse signal of a single power generation sensor and the output signal of a sensor element different from the power generation sensor, and performs a counting operation according to the result of the determination. Even in this case, the segment counter suffers from inconvenience if the pulse missing occurs when the count value of the segment counter and the detection value of the precision position detector are combined with each other. In PTL 2, therefore, the magnetization state of the magnetic wire of the power generation sensor is monitored, and the value of the segment counter is corrected for a missing voltage pulse according to the magnetization state. Thus, the count value of the segment counter and the detection value of the precision position detector are synchronized and combined with each other.

Specifically, an electric current flowing through the coil of the power generation sensor is gradually increased, and a magnetic field generated by the coil is applied to the magnetic wire for the monitoring of the magnetization state as disclosed in PTL 2. Thereby, whether or not the magnetization direction of the magnetic wire is reversed is monitored by observing a voltage appearing between the opposite ends of the coil. Thus, the magnetization state of the magnetic wire can be checked.

However, PTL 2 requires a complicated signal processing operation for the determination of the magnetization direction of the magnetic wire and for the correction of the count value based on the result of the determination. This correspondingly makes it difficult to reduce the size and the costs of the device.

CITATION LIST

Patent Literature

PTL 1: JP6226811
PTL 2: JP5730809

SUMMARY OF INVENTION

Problems to Be Solved by Invention

One example embodiment of the present invention provides a multiturn angle detection device that is advantageous for the size reduction and the cost reduction thereof.

More specifically, the example embodiment of the present invention provides a multiturn angle detection device that can generate a multiturn absolute angle detection value by combining the count value of a segment counter not employing a plurality of power generation sensors with the angle detection value of a precision absolute angle detector without the need for complicated signal processing.

Solution to Problems

One example embodiment of the present invention provides a multiturn angle detection device to generate the multiturn absolute angle detection value of a rotating body that is rotated about a rotation axis. The multiturn angle detection device includes: a segment counter to generate a count value according to the rotation of the rotating body by counting segments defined by dividing (equally dividing) the single-turn cycle of the rotating body in an angular range over the single turn of the rotating body; a precision absolute angle detector, operative with external electric power supply, to generate an absolute angle detection value within the single-turn cycle of the rotating body at a resolution higher than the segments; and an arithmetic device, operative with the external electric power supply, to generate the multiturn absolute angle detection value of the rotating body by combining the count value of the segment counter with the absolute angle detection value of the precision absolute angle detector. The segment counter includes: a single (sole) power generation sensor; a magnetic field generation source to be rotated together with the rotating body about the rotation axis; a sensor element different from the power generation sensor (typically, a sensor element other than the power generation sensor); and a nonvolatile memory to store the count value. The power generation sensor includes a magnetic wire that exhibits a large Barkhausen effect, and a coil wound around the magnetic wire, and generates a voltage pulse according to a magnetic field change occurring due to the rotation of the magnetic field generation source. The magnetic field generation source applies a k-cycle alternating magnetic field (wherein k is an integer not smaller than 3) per each turn of the rotating body axially of the magnetic wire. The segment counter is operative with the energy of the voltage pulse generated by the power generation sensor without receiving the external electric power supply, and is to detect the rotation direction and the rotational position of the rotating body by using the voltage pulse generated by the power generation sensor and the output signal of the sensor element to update the count value, and to store the updated count value in the nonvolatile memory. The arithmetic device uses the count value stored in the nonvolatile memory as it is (i.e., without performing a correcting process to correct the count value of the segment counter) when receiving the external electric power supply, and generates the multiturn absolute angle detection value of the rotating body by combining the count value of the segment counter with the absolute angle detection value of the precision absolute angle detector.

With this arrangement, the magnetic field generation source applies the k-cycle alternating magnetic field per each turn axially of the magnetic wire, whereby the power generation sensor generates 2k voltage pulses per each turn. Since k≥3, three or more-cycle alternating magnetic field per each turn is applied to the magnetic wire. Thus, the magnetic wire generates six or more voltage pulses per each turn. For example, the segment counter can generate the count value by counting segments defined by dividing the single-turn cycle into k or more (e.g., k or 2k), i.e., by counting segments defined by dividing the single-turn cycle into three or more. Even if the rotation direction is reversed to cause a count error due to the pulse missing, the error is not a critical error such that the same count value is generated in the angular range over one turn. Thus, three or more-cycle alternating magnetic field per each turn is applied to the magnetic wire, and the magnetic wire generates six or more voltage pulses per each turn, whereby the precise multiturn absolute angle value can be uniquely determined for a given multiturn absolute angle based on a combination of the count value of the segment counter and the absolute angle detection value of the precision absolute angle detector. That is, even if the count value of the segment counter is erroneous, the count value can be combined with the angle detection value of the precision absolute angle detector without performing the correcting process on the count value (i.e., by using the count value as it is).

Thus, the precise multiturn absolute angle detection value can be generated with the use of the sole power generation sensor by combining the count value of the segment counter with the angle detection value of the precision absolute angle detector without performing a magnetization direction determining process to determine the magnetization direction of the magnetic wire and performing a correction/synchronization process based on the result of the determination.

In an example embodiment of the present invention, the magnetic field generation source includes k magnets arranged on a circle defined about the rotation axis with their magnetic poles of the same polarity to be opposed to the power generation sensor. The magnetic wire of the power generation sensor is disposed parallel to a tangential line of the circle. The power generation sensor includes a first magnetic flux conducting piece and a second magnetic flux conducting piece respectively magnetically coupled to the opposite end portions of the magnetic wire. As the magnetic field generation source is rotated, the magnetic poles are sequentially moved closer to the first magnetic flux conducting piece and the second magnetic flux conducting piece. The power generation sensor generates a negative voltage pulse in a first state in which a magnetic flux from any one of the magnetic poles of the magnetic field generation source is conducted through the first magnetic flux conducting piece, and generates a positive voltage pulse in a second state in which the magnetic flux from the magnetic field generation source is conducted through the second magnetic flux conducting piece.

In this example embodiment, typically, the magnetic poles of the k magnets having the same polarity are moved along a circular track defined about the rotation axis, and the magnetic poles of the k magnets having the other polarity are not disposed on the circular track. Therefore, as the rotating body is rotated in one direction, the magnetic poles of the same polarity are sequentially brought into opposed relation to the power generation sensor, and the first state and the second state are alternately repeated.

With this arrangement, the magnetic poles of the k magnets of the magnetic field generation source having the same polarity are arranged so as to be opposed to the power generation sensor. Consideration is given, for example, to a case in which the magnetic field generation source is rotated together with the rotating body and any one of the magnetic poles is moved closer to the first magnetic flux conducting piece in a set state (a set state for the negative pulse generation) in which the soft layer and the hard layer of the magnetic wire are magnetized in a direction extending from the second magnetic flux conducting piece to the first magnetic flux conducting piece. The magnetic flux from that magnetic pole is conducted through the first magnetic flux conducting piece, whereby the magnetization direction of the soft layer of the magnetic wire is reversed to generate a negative pulse. When that magnetic pole is moved still closer to the first magnetic flux conducting piece, the magnetization direction of the hard layer is also reversed, and the magnetic wire is brought into a set state for the positive pulse generation. When the magnetic field generation source is further rotated and that magnetic pole is moved closer to the second magnetic flux conducting piece, the magnetic flux from that magnetic pole is conducted through the second magnetic flux conducting piece. Thus, the magnetization direction of the soft layer of the magnetic wire is reversed, and a positive pulse is generated. When that magnetic pole is moved still closer to the second magnetic flux conducting piece, the magnetization direction of the hard layer is also reversed, and the magnetic wire is brought into the set state for the negative pulse generation. The single magnetic pole thus passes through the detection region of the power generation sensor, whereby the two pulses are generated.

In an example embodiment of the present invention, the sensor element detects whether or not any one of the magnetic poles of the magnetic field generation source is present at a position opposed to the middle portion of the power generation sensor, and boundaries between the segments each define an angular position such that the one magnetic pole is opposed to the middle portion of the power generation sensor.

The segment boundary is a boundary at which the count value of the segment counter is changed.

By causing the sensor element to detect whether or not any one of the magnetic poles of the magnetic field generation source is opposed to the middle portion of the power generation sensor, the rotational position and the rotation direction can be detected based on the outputs of the sensor element and the power generation sensor.

In an example embodiment of the present invention, the magnetic field generation source includes k pairs of magnetic poles disposed on the circle defined about the rotation axis with their N-poles and S-poles alternately arranged.

Consideration is given, for example, to an initial state in which one S-pole is opposed to the middle portion of the power generation sensor and magnetic fluxes from N-poles disposed in pair on opposite sides of the S-pole are balanced with each other in the set state (the set state for the negative pulse generation) in which the soft layer and the hard layer of the magnetic wire are magnetized in the direction extending from the second magnetic flux conducting piece to the first magnetic flux conducting piece. When the magnetic field generation source is slightly rotated together with the rotating body from the initial state, a magnetic flux directed from an end of the magnetic wire adjacent to the first magnetic flux conducting piece to an end of the magnetic wire adjacent to the second magnetic flux conducting piece is increased to thereby achieve the operational magnetic field. Thus, the magnetization direction of the soft layer of the magnetic wire is reversed, whereby a negative pulse is generated. When the magnetic field generation source is further rotated together with the rotating body, the magnetic flux directed from the end of the magnetic wire adjacent to the first magnetic flux conducting piece to the end of the magnetic wire adjacent to the second magnetic flux conducting piece is further increased to thereby achieve the stabilization magnetic field. Thus, the magnetization direction of the hard layer is also reversed, whereby the magnetic wire is brought into the set state for the positive pulse generation. When the magnetic field generation source is further rotated, a magnetic flux directed from the end of the magnetic wire adjacent to the second magnetic flux conducting piece to the end of the magnetic wire adjacent to the first magnetic flux conducting piece is increased to thereby achieve the operational magnetic field. Thus, the magnetization direction of the soft layer of the magnetic wire is reversed, whereby a positive pulse is generated. When the magnetic field generation source is further rotated, the magnetic flux directed from the end of the magnetic wire adjacent to the second magnetic flux conducting piece to the end of the magnetic wire adjacent to the first magnetic flux conducting piece is further increased to thereby achieve the stabilization magnetic field. Thus, the magnetization direction of the hard layer is also reversed, whereby the magnetic wire is brought into the set state for the negative pulse generation. A single magnetic pole pair thus passes through the detection region of the power generation sensor, whereby the two pulses are generated.

In an example embodiment of the present invention, the magnetic wire of the power generation sensor is located on a tangential line of a circle defined about the rotation axis with its middle point located at a contact point on the tangential line.

In an example embodiment of the present invention, the sensor element detects the polarity of any one of the magnetic poles opposed to the middle portion of the power generation sensor, and boundaries between the segments each define an angular position such that one of the N-poles and the S-poles of the magnetic pole pairs is opposed to the middle portion of the power generation sensor.

The polarity of the magnetic pole opposed to the middle portion of the power generation sensor is detected by the sensor element. This makes it possible to detect the rotational position and the rotation direction based on the outputs of the sensor element and the power generation sensor.

The above and other objects, features and advantages of the present invention will become more apparent from the following description of the example embodiments with reference to the attached drawings.

BRIEF DESCRIPTION OF DRAWINGS

FIGS. 3D, 3E and 3F are diagrams for describing the function of the power generation sensor.

FIG. 5 is a table for describing the counting operation to be performed by the segment counter in greater detail by way of example.

DESCRIPTION OF EXAMPLE EMBODIMENTS

Figure 1:
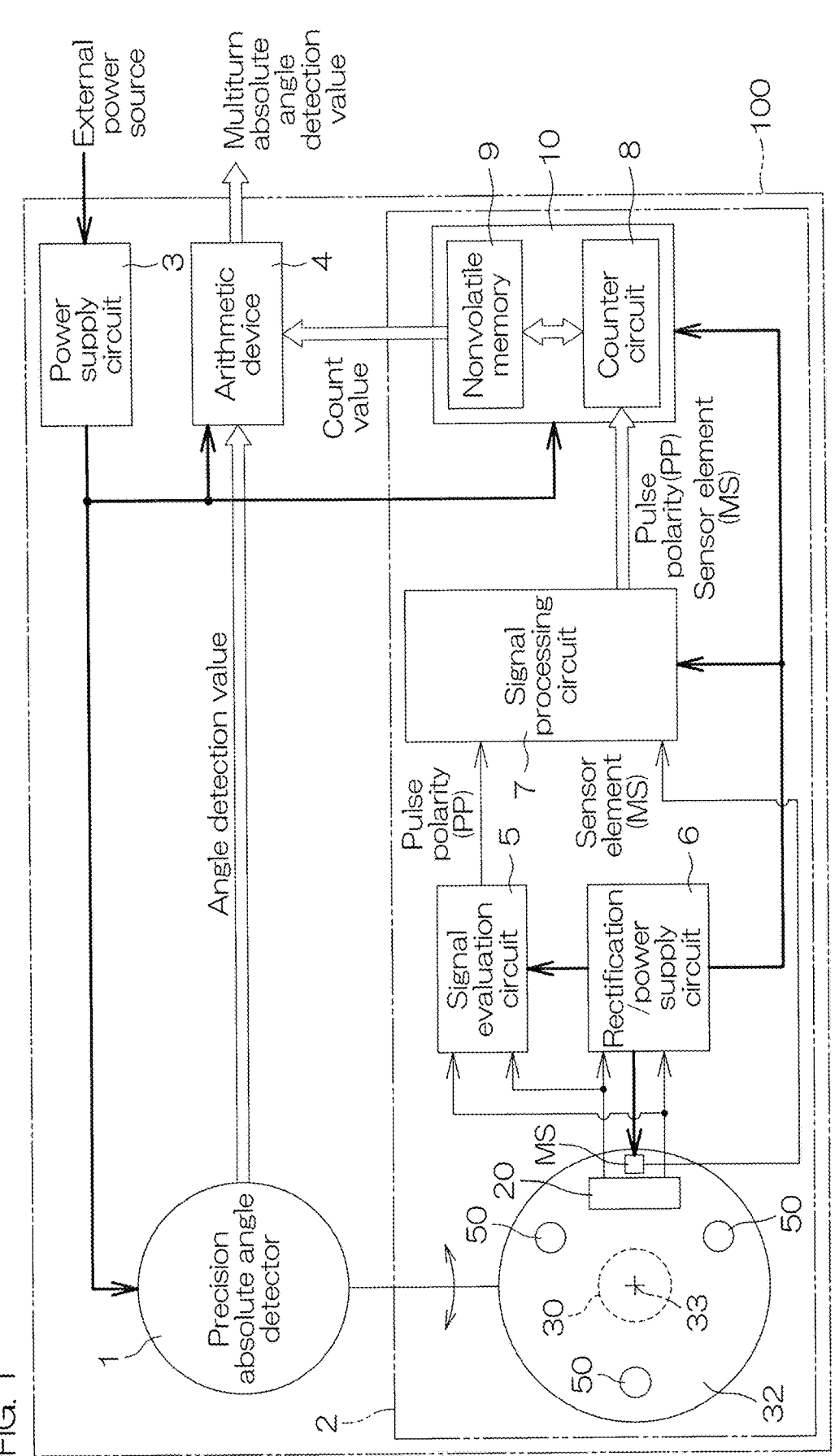
FIG. 1 is a block diagram that describes the configuration of a multiturn angle detection device according to one example embodiment of the present invention by way of example.

FIG. 1 is a block diagram that describes a multiturn angle detection device according to one example embodiment of the present invention by way of example. The multiturn angle detection device 100 is a device that detects the multiturn absolute angle of a rotation shaft 30 (an example of the rotating body) to be rotated about a rotation axis 33, and generates a detection value as a multiturn absolute angle detection value. The multiturn absolute angle is an absolute angle in an angular range over one turn (i.e., in a multiturn angular range). The multiturn angle detection device 100 includes a precision absolute angle detector 1, a segment counter 2 and an arithmetic device 4.

The precision absolute angle detector 1 is an angle sensor that generates a precise absolute angle detection value within the single-turn cycle of the rotation shaft 30 (i.e., 0 degree to 360 degrees) at a resolution higher than that of the segment counter 2 to be described below. The precision absolute angle detector 1 is constituted, for example, by an optical absolute encoder. The precision absolute angle detector 1 is configured to generate an absolute angle detection value, for example, within an angular range of a single-turn cycle (0 degree to 360 degrees) at a resolution of 16 bits (65536 steps).

The precision absolute angle detector 1 is typically operative by receiving electric power supply from an external power source. Specifically, the multiturn angle detection device 100 includes a power supply circuit 3 connectable to the external power source. The power supply circuit 3 supplies electric power to the precision absolute angle detector 1 when being connected to the external power source, and the precision absolute angle detector 1 is operative by receiving the electric power. The precision absolute angle detector 1 inputs the 16-bit absolute angle detection value to the arithmetic device 4, for example, through serial communications.

The segment counter 2 counts segments defined by dividing (equally dividing) the single-turn cycle of the rotation shaft 30 as the rotation shaft 30 is rotated, and generates a count value indicating a segment-based angle value in an angular range of the multiple turns of the rotation shaft 30 (over one turn).

The segment counter 2 includes a single (sole) power generation sensor 20, a magnetic field generation source 50 to be rotated together with the rotation shaft 30 about the rotation axis 33, a sensor element MS different from the power generation sensor 20 (other than the power generation sensor), a counter circuit 8, and a nonvolatile memory 9 that stores the count value. The nonvolatile memory 9 may be constituted by a FeRAM (ferroelectric random access memory). In this example embodiment, the counter circuit 8 and the nonvolatile memory 9 are incorporated in a single counter memory IC (integrated circuit) 10. The segment counter 2 further includes a signal evaluation circuit 5, a rectification/power supply circuit 6 and a signal processing circuit 7.

The power generation sensor 20 generates a voltage pulse according to a magnetic field change due to the rotation of the magnetic field generation source 50. In this example embodiment, the sensor element MS is a magnetic sensor that detects the magnetic field of the magnetic field generation source 50 according to the rotation of the magnetic field generation source 50. An example of the magnetic sensor is a Hall IC. The signal evaluation circuit 5 determines the polarity of the voltage pulse generated by the power generation sensor 20, and supplies a signal indicating the result of the determination of the polarity (pulse polarity PP) to the signal processing circuit 7. The signal processing circuit 7 converts the signal indicating the polarity determination result received from the signal evaluation circuit 5 into digital data (serial signal), and supplies the digital data as polarity determination data (pulse polarity PP) to the counter circuit 8. Further, the signal processing circuit 7 converts the output signal of the sensor element MS into digital data (serial signal), and supplies the digital data as magnetic detection data to the counter circuit 8.

The rectification/power supply circuit 6 rectifies the voltage pulse generated by the power generation sensor 20 to a proper voltage level, and supplies the resulting voltage pulse to the sensor element MS, the signal evaluation circuit 5, the signal processing circuit 7 and the counter memory IC 10 (the counter circuit 8 and the nonvolatile memory 9). Therefore, the sensor element MS, the signal evaluation circuit 5, the signal processing circuit 7 and the counter memory IC 10 (the counter circuit 8 and the nonvolatile memory 9) are operative without receiving the electric power supply from the external power source. That is, the segment counter 2 is operative with electric power generated by self-power generation even without the external electric power supply. The counter memory IC 10 is operative by receiving the electric power supply from the power supply circuit 3 when the power supply circuit 3 is connected to the external power source.

The counter circuit 8 incorporated in the counter memory IC 10 performs a counting operation based on the polarity determination data (pulse polarity PP) and the magnetic detection data (MS) supplied from the signal processing circuit 7 according to a predetermined counting logic. The counting operation is performed whether or not the electric power is supplied from the external power source through the power supply circuit 3. The count value is provided by the counting operation, and stored in the nonvolatile memory 9. The count value is kept stored even without the electric power supply (nonvolatile storage). The counter memory IC 10 supplies the count value from the nonvolatile memory 9 to the arithmetic device 4 through serial communications when the electric power is supplied from the external power source.

The arithmetic device 4 is operative by receiving the electric power supply from the power supply circuit 3 when the power supply circuit 3 is connected to the external power source. When the external power source is turned on, the arithmetic device 4 requests the precision absolute angle detector 1 to supply the precise absolute angle detection value, and requests the nonvolatile memory 9 to supply the count value. The precision absolute angle detector 1 supplies the precise absolute angle detection value to the arithmetic device 4 through serial communications. The nonvolatile memory 9 supplies the count value to the arithmetic device 4 through serial communications. The arithmetic device 4 combines the precise absolute angle detection value with the count value to generate the multiturn absolute angle detection value, and outputs the multiturn absolute angle detection value. The multiturn absolute angle detection value outputted from the arithmetic device 4 is supplied, for example, to an upper level controller (not shown), and is used for the rotation control of an electric motor and the like.

The arithmetic device 4 uses the count value supplied from the nonvolatile memory 9 as it is, and combines the count value with the precise absolute angle detection value. That is, the count value to be used for the combining is a count value obtained by the segment counter 2 when the power supply is off. The arithmetic device 4 does not correcting process for correction of an error in the count value, specifically, does not perform a synchronizing process or the like to correct the error in the count value and synchronize the count value with the precise absolute angle detection value.

Figures 2A, 2B, 2C:
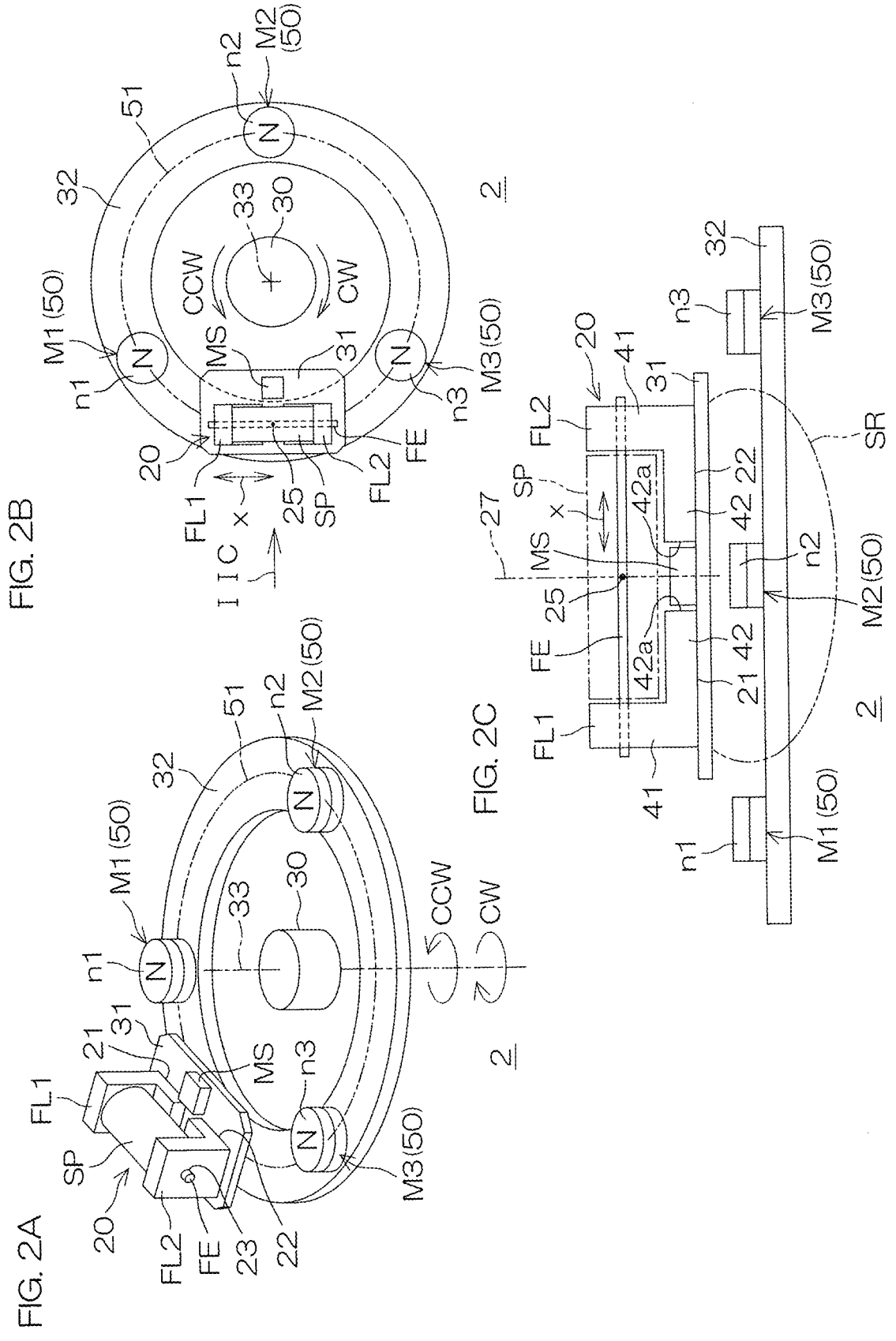
FIG. 2A is a perspective view that describes the structure of a segment counter by way of example.
FIG. 2B is a plan view of the segment counter.
FIG. 2C is a front view of the segment counter as seen in an arrow direction IIC in FIG. 2B.

FIG. 2A is a perspective view that describes the structure of the segment counter 2 by way of example, and FIG. 2B is a plan view of the segment counter 2. Further, FIG. 2C is a front view of the segment counter 2 as seen in an arrow direction IIC. The segment counter 2 includes the power generation sensor 20, the magnetic field generation source 50 and the sensor element MS (e.g., magnetic sensor).

The power generation sensor 20 is disposed on a first support 31, and supported by the first support 31. In this example embodiment, the sensor element MS is also mounted on the first support 31.

The magnetic field generation source 50 is fixed to a second support 32. The second support 32 is movable relative to the first support 31. Specifically, the second support 32 is combined with (fixed to) the rotation shaft 30, and is rotatable together with the rotation shaft 30 about the rotation axis 33. Therefore, the second support 32 is a part of the rotating body. In contrast, the first support 31 is stationary to be held in a nonrotatable state. Thus, the magnetic field generation source 50 is rotatable together with the second support 32 about the rotation axis 33 to be thereby moved relative to the first support 31.

The rotation shaft 30 is typically rotated by a driving force applied from the drive shaft of the electric motor (not shown). Where the electric motor is driven in opposite directions, the rotation shaft 30 is correspondingly rotated in a counterclockwise direction CCW and in a clockwise direction CW. The first support 31 may be a printed wiring board disposed in a plane orthogonal to the rotation axis 33.

The magnetic field generation source 50 includes k magnets M1, M2, . . . , Mk (wherein k is an integer not smaller than 3, k=3 in this example embodiment) disposed apart from the rotation axis 33. The magnets M1, M2, . . . , Mk are fixed to the second support 32 so as to sequentially enter the detection region SR of the power generation sensor 20 by the rotational movement of the second support 32 about the rotation axis 33. The magnets M1, M2, . . . , Mk are magnetized so that the magnetic poles n1, n2, . . . , nk thereof having the same polarity (N-poles in this example) are each brought into opposed relation to the power generation sensor 20 in the detection region SR. The magnetic poles n1, n2, . . . , nk are moved along a circular track 51 defined about the rotation axis 33. The layout of the power generation sensor 20 and the magnetic field generation source 50 is defined so that the circular track 51 passes through the detection region SR. The magnetic poles n1, n2, . . . , nk are equidistantly arranged on the circular track 51.

The power generation sensor 20 is mounted on one of the major surfaces of the first support 31 (printed wiring board). The power generation sensor 20 includes a magnetic wire FE, and a first magnetic flux conducting piece FL1 and a second magnetic flux conducting piece FL2 respectively magnetically coupled to the opposite ends of the magnetic wire FE. A coil SP (induction coil) is wound around the magnetic wire FE between the first magnetic flux conducting piece FL1 and the second magnetic flux conducting piece FL2. The first magnetic flux conducting piece FL1 and the second magnetic flux conducting piece FL2 are magnetically soft components having substantially the same shape and substantially the same size. More specifically, the first magnetic flux conducting piece FL1 and the second magnetic flux conducting piece FL2 are configured symmetrically with respect to a symmetry plane 27 (a virtual plane to be used to describe the geometrical layout) extending orthogonally to an axis direction x through the axially middle point 25 of the magnetic wire FE (hereinafter referred to simply as "axially middle point 25").

The magnetic wire FE is configured to exhibit the large Barkhausen effect. Specifically, the magnetic wire FE has a core portion, and a shell portion covering the core portion. One of the core portion and the shell portion is a soft layer (magnetically soft layer) in which its magnetization direction is reversed even by application of a weak magnetic field, and the other of the core portion and the shell portion is a hard layer (magnetically hard layer) in which its magnetization direction is reversed only by application of a strong magnetic field.

The magnetic flux conducting pieces FL1, FL2 respectively have magnetic flux conducting ends 21, 22 opposed to the detection region SR. The axis direction x of the magnetic wire FE is set parallel to a tangential line of the circular track 51 extending through a point (contact point) present on the circular track 51 between the pair of magnetic flux conducting ends 21, 22, and the middle point 25 of the magnetic wire FE with respect to the axis direction x (hereinafter referred to as "axially middle point 25") is set on a perpendicular line extending through the contact point perpendicularly to the tangential line. The coil SP generates a negative voltage pulse in a first state in which a magnetic flux from the magnetic pole n1, n2, . . . , nk of the magnet M1, M2, . . . , Mk is conducted through the first magnetic flux conducting piece FL1, and generates a positive voltage pulse in a second state in which the magnetic flux from the magnetic pole n1, n2, . . . , nk of the magnet M1, M2, . . . , Mk is conducted through the second magnetic flux conducting piece FL2.

In this example embodiment, the first magnetic flux conducting piece FL1 and the second magnetic flux conducting piece FL2 respectively have axis-orthogonal portions 41 extending parallel to each other from the opposite ends of the magnetic wire FE orthogonally to the axis direction x, and axis-parallel portions 42 respectively extending toward each other from the distal end portions of the axis-orthogonal portions 41 in the axis direction x. The opposite ends of the magnetic wire FE are respectively fixed to the proximal portions of the axis-orthogonal portions 41 of the first magnetic flux conducting piece FL1 and the second magnetic flux conducting piece FL2. More specifically, the proximal portions of the axis-orthogonal portions 41 each include a wire placement portion 23 formed with a hole or a groove extending therethrough in the axis direction x. The opposite end portions of the magnetic wire FE respectively extend through the wire placement portions 23 of the axis-orthogonal portions 41 of the first magnetic flux conducting piece FL1 and the second magnetic flux conducting piece FL2, and are respectively fixed to the axis-orthogonal portions 41. The magnetic wire FE is connected and fixed to the first magnetic flux conducting piece FL1 and the second magnetic flux conducting piece FL2, for example, by resin portions (not shown) each provided in the hole or the groove of the wire placement portion 23. Thus, the opposite end portions of the magnetic wire FE are respectively magnetically coupled to the first magnetic flux conducting piece FL1 and the second magnetic flux conducting piece FL2.

The power generation sensor 20 is configured so that a region opposite from the magnetic wire FE with respect to the axis-parallel portions 42 is defined as the detection region SR for the detection of a magnetic field.

The magnetic flux conducting pieces FL1, FL2 each composed of the magnetically soft component each include the axis-orthogonal portion 41 (having a generally parallel-epiped shape) and the axis-parallel portion 42 (having a generally parallelepiped shape) connected to the distal end portion of the axis-orthogonal portion 41 adjacent to the detection region SR, and each have an L-shape bent at a right angle at a connection portion between the axis-orthogonal portion 41 and the axis-parallel portion 42. The axis-parallel portions 42 extend in the axis direction x so as to shield the magnetic wire FE, i.e., so as to shield the magnetic wire FE from the detection region SR. The first magnetic flux conducting piece FL1 and the second magnetic flux conducting piece FL2, which are symmetrically configured, extend toward the axially middle portion of the magnetic wire FE, and the adjacent ends 42a of the first magnetic flux conducting piece FL1 and the second magnetic flux conducting piece FL2 are opposed to each other with a gap defined therebetween around the axially middle point 25 of the magnetic wire FE. The adjacent ends 42a each have a surface extending orthogonally to the axis direction x, and the two surfaces of the two adjacent ends 42a are parallel to each other and opposed to each other in the axis direction x.

The magnetic flux conducting ends 21, 22 of the axis-parallel portions 42 of the magnetic flux conducting piece FL1 and the second magnetic flux conducting piece FL2 respectively serve as detection region opposition surfaces opposed to the detection region SR. The magnetic flux conducting ends 21, 22 (detection region opposition surfaces) are planar surfaces parallel to the axis direction x. When any one of the magnetic poles is located in the detection region SR, the magnetic flux conducting ends 21, 22 (detection region opposition surfaces) guide a magnetic flux from that magnetic pole into the first magnetic flux conducting piece FL1 and the second magnetic flux conducting piece FL2.

The axis-parallel portions 42 of the first magnetic flux conducting piece FL1 and the second magnetic flux conducting piece FL2 are joined with a wiring pattern (not shown) formed on the one major surface of the first support 31 (printed wiring board), whereby the power generation sensor 20 is surface-mounted on the first support 31 (printed wiring board). The power generation sensor 20 is disposed so that the axis direction x of the magnetic wire FE extends along a tangential line of a circle defined about the rotation axis 33 through a point (contact point) present on the circle, and the axially middle point 25 of the magnetic wire FE coincides with the contact point. The detection region SR of the power generation sensor 20 is located on a side of the axis-parallel portions 42 opposite from the magnetic wire FE and, in this example, is a region adjacent to the other major surface of the first support 31 (printed wiring board).

The k magnets M1, M2, . . . , Mk of the magnetic field generation source 50 are disposed with their magnetic poles n1, n2, n3 . . . , nk of the same polarity (the N-poles in the illustrated example) to be opposed to the first support 31 (printed wiring board). In this example, the second support 32 is configured in an annular shape surrounding the rotation axis 33. More specifically, the second support 32 is constituted by an annular plate, and is disposed in a plane orthogonal to the rotation axis 33 and parallel to the first support 31 (printed wiring board). The magnets M1, M2, . . . . Mk are fixed to a surface of the second support 32 opposed to the other major surface of the first support 31 (printed wiring board). The magnets M1, M2, . . . , Mk are arranged circumferentially equidistantly about the rotation axis 33. In the illustrated specific example, three magnets M1, M2, M3 are arranged at an angular interval of 120 degrees about the rotation axis 33. The magnetization directions of the magnets M1, M2, . . . , Mk are parallel to the rotation axis 33. The magnets M1, M2, . . . , Mk are fixed to the second support 32 so that the magnetic poles n1, n2, . . . , nk of the same polarity (the N-poles in the illustrated example) are opposed to the first support 31 (printed wiring board). Distances from the rotation axis 33 to the magnets M1, M2, . . . , Mk (more specifically, to the centers of the magnetic poles n1, n2, . . . , nk to be opposed to the first support 31) are each equal to a distance from the rotation axis 33 to the axially middle point 25 of the magnetic wire FE. That is, the magnetic wire FE and the magnets M1, M2, . . . , Mk are located on the same radius circle defined about the rotation axis 33 in plan view along the rotation axis 33. Thereby, the magnetic wire FE and the magnets M1, M2, . . . , Mk are arranged in a positional relationship such that the magnets M1, M2, . . . , Mk can be opposed to the magnetic wire FE in a direction parallel to the rotation axis 33. The second support 32 is preferably a yoke composed of a magnetically soft component.

As the second support 32 is rotated together with the rotation shaft 30 about the rotation axis 33, the magnetic poles n1, n2, . . . , nk are moved on the circular track 51 extending through the detection region SR about the rotation axis 33. The axis direction x of the magnetic wire FE is parallel to the tangential line of the circular track 51 extending through the certain point (contact point) present on the circular track 51, and the axially middle point 25 is present on the perpendicular line extending through the contact point perpendicularly to the tangential line (in this example, the perpendicular line parallel to the rotation axis 33). In other words, the axially middle point 25 of the magnetic wire FE is located at a certain point (contact point) present on a circle defined about the rotation axis 33 and having the same radius as the circular track 51, and the magnetic wire FE extends along a tangential line of the circle extending through the contact point.

A distance between the first support 31 and the second support 32 as measured along the rotation axis 33 is set to a suitable value that permits the magnetic poles n1, n2, . . . , nk of the magnets M1, M2, . . . , Mk to enter the detection region SR of the power generation sensor 20 by the rotation of the second support 32.

The sensor element MS (e.g., magnetic sensor) is also mounted on the major surface of the first support 31 (printed wiring board) mounted with the power generation sensor 20. In this example, the sensor element MS is located so as to be generally opposed to the middle point of the magnetic wire FE with respect to the axis direction x. Thus, the sensor element MS detects a magnetic field from any one of the magnetic poles n1, n2, . . . , nk to output an identification signal when the one magnetic pole n1, n2, . . . , nk is opposed to the power generation sensor 20 on the circular track 51 between the first magnetic flux conducting piece FL1 and the second magnetic flux conducting piece FL2. Thereby, the sensor element MS detects whether or not any one of the magnetic poles n1, n2, nk is located in opposed relation to the middle portion of the power generation sensor 20, and outputs an identification signal indicating the detection result. The sensor element MS may be disposed in some other layout. Specifically, the sensor element MS may be located at a position at which a magnetic field from any one of the magnetic poles n1, n2, . . . nk can be detected when another of the magnetic poles n1, n2, . . . , nk is opposed to the middle portion of the power generation sensor 20. More specifically, with reference to the layout shown in FIG. 2B, the sensor element MS may be disposed at any one of plural positions arranged at an angular interval of 360 degrees/k (where k=3, at an interval of 120 degrees) about the rotation axis 33.

With this arrangement, one negative pulse and one positive pulse are sequentially generated, every time the magnetic pole n1, n2, . . . , nk of the magnet M1, M2, . . . , Mk passes through the detection region SR along the circular track 51 by the rotation about the rotation axis 33 in the counterclockwise direction CCW. Further, one positive pulse and one negative pulse are sequentially generated, every time the magnetic pole n1, n2, . . . , nk of the magnet M1, M2, . . . , Mk passes through the detection region SR along the circular track 51 by the rotation about the rotation axis 33 in the clockwise direction CW. The rotational position and the rotation direction can be detected based on these pulses and the identification signal outputted by the sensor element MS when the magnet M1, M2, . . . , Mk is located between the first magnetic flux conducting piece FL1 and the second magnetic flux conducting piece FL2 on the circular track 51.

Figures 3A, 3B, 3C:
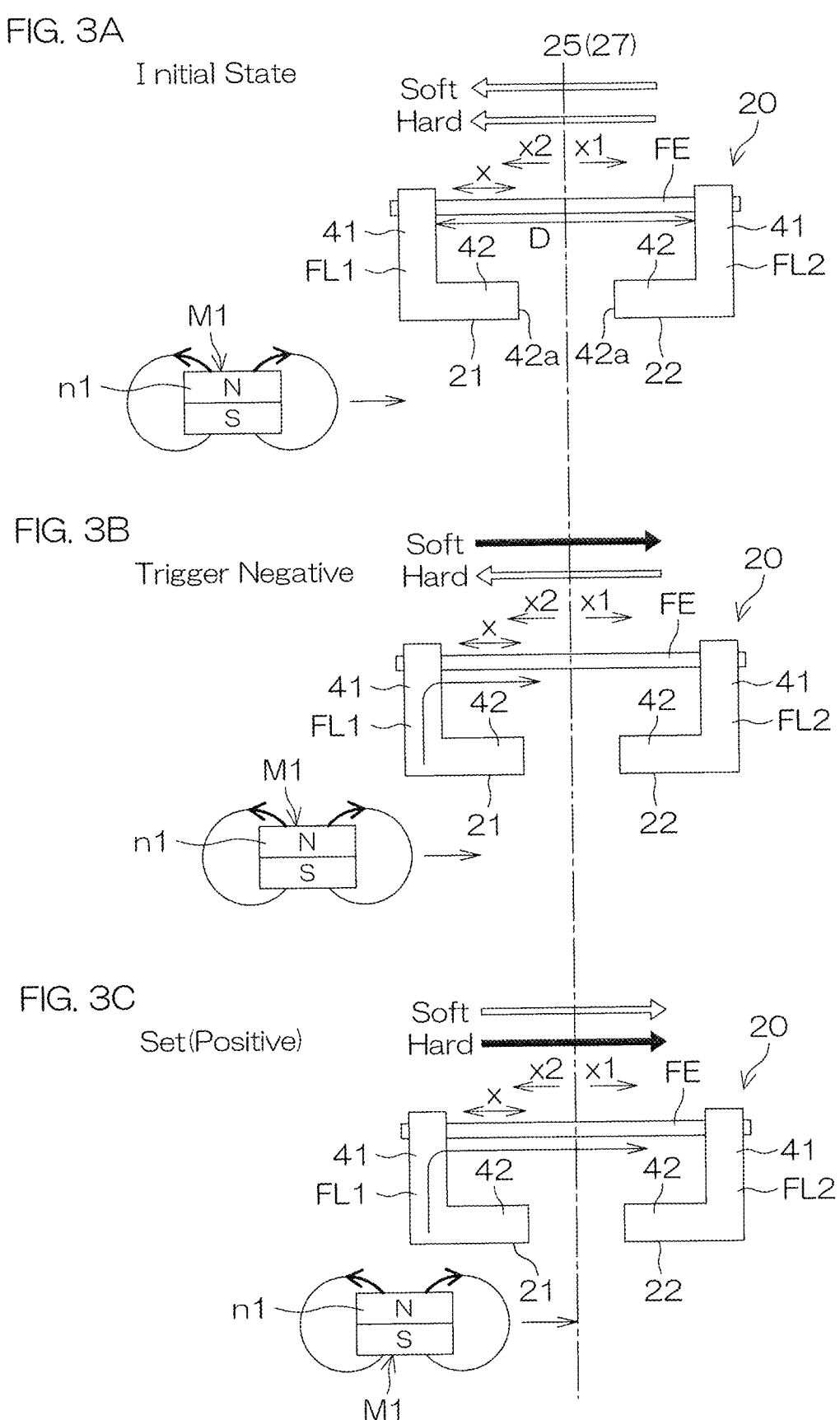
FIGS. 3A, 3B and 3C are diagrams for describing the function of a power generation sensor.

FIGS. 3A to 3F are diagrams for describing the function of the power generation sensor 20 in detail. FIG. 3A (Initial State) shows a first set state which is a preparatory state for the outputting of a negative voltage pulse. That is, the magnetization directions of the soft layer and the hard layer of the magnetic wire FE are consistent to both extend in a second axial direction x2. When the magnetic pole n1 (the N-pole in the illustrated example) of the magnet M1 is moved closer to the magnetic flux conducting end 21 (the detection region opposition surface of the axis-parallel portion 42) of the first magnetic flux conducting piece FL1 in the first set state, as shown in FIG. 3B (Trigger Negative), the first state is achieved in which the magnetic flux from the magnetic pole n1 is conducted through the first magnetic flux conducting piece FL1, whereby the operational magnetic field is applied to the magnetic wire FE in a first axial direction x1. Thus, the large Barkhausen effect is exhibited to reverse the magnetization direction of the soft layer into the first axial direction x1. Accordingly, the coil SP generates a negative voltage pulse.

When the magnetic pole n1 is further moved closer to the magnetic flux conducting end 21 of the first magnetic flux conducting piece FL1 from the first state, as shown in FIG. 3C (Set (Positive)), the magnetic flux applied to the magnetic wire FE in the first axial direction x1 is strengthened to apply the stabilization magnetic field, whereby the magnetization direction of the hard layer is also reversed into the first axial direction x1. Thus, a second set state is achieved, in which the magnetization directions of the soft layer and the hard layer are consistent to both extend in the first axial direction x1. The second set state is a preparatory state for the generation of a positive voltage pulse.

When the magnet M1 is further moved from the second set state to move the magnetic pole n1 closer to the magnetic flux conducting end 22 (the detection region opposition surface of the axis-parallel portion 42) of the second magnetic flux conducting piece FL2, as shown in FIG. 3E (Trigger Positive), the second state is achieved, in which the magnetic flux from the magnetic pole n1 is conducted through the second magnetic flux conducting piece FL2, whereby the operational magnetic field is applied to the magnetic wire FE in the second axial direction x2. Thus, the large Barkhausen effect is exhibited to reverse the magnetization direction of the soft layer into the second axial direction x2. Accordingly, the coil SP generates a positive voltage pulse.

When the magnet M1 is further moved from the second state to move the magnetic pole n1 still closer to the magnetic flux conducting end 22 of the second magnetic flux conducting piece FL2, as shown in FIG. 3F (Set (Negative)), the magnetic flux applied to the magnetic wire FE in the second axial direction x2 is strengthened to apply the stabilization magnetic whereby the magnetization direction of the hard layer is also reversed into the second axial direction x2. Thus, the first set state (the preparatory state for the outputting of the negative voltage pulse) is achieved again, in which the magnetization directions of the soft layer and the hard layer are consistent to both extend in the second axial direction x2.

When the magnetic pole n1 is moved through the vicinity of the power generation sensor 20, the axis-parallel portions 42 of the magnetic flux conducting pieces FL1, FL2 are located between the magnetic wire FE and the magnetic pole n1. Thus, the axis-parallel portions 42 magnetically shield the magnetic wire FE. Therefore, the magnetic flux from the magnetic pole n1 is attracted to the magnetic flux conducting ends 21, 22 (the detection region opposition surfaces of the axis-parallel portions 42) through which the magnetic flux enters the magnetic flux conducting pieces FL1, FL2 to be guided to the ends of the magnetic wire FE. This makes it possible to apply a magnetic field in the axis direction x to the magnetic wire FE over substantially the entire axial length range of the magnetic wire FE. That is, the magnetic flux conducting pieces FL1, FL2 are configured so as to have a magnetic field correcting function such that a magnetic field generated around the magnetic flux conducting ends 21, 22 by the magnetic pole n1 is corrected into a magnetic field extending in the axis direction x and the corrected magnetic field is applied to the magnetic wire FE.

Even when the magnetic pole n1 is located at an intermediate position between the magnetic flux conducting pieces FL1, FL2 provided in pair, as shown in FIG. 3D (Balanced), almost no magnetic flux is guided from the magnetic pole n1 directly to the axially middle portion of the magnetic wire FE because of the magnetic field correcting function. At this time, magnetic fluxes respectively conducted through the magnetic flux conducting pieces FL1, FL2 and applied from the opposite end portions of the magnetic wire FE are balanced. Therefore, no magnetic field is applied to the magnetic wire FE and, hence, the magnetization direction of the magnetic wire FE is not changed. Then, a state shown in FIG. 3E is achieved, in which the soft layer is reversed at once to generate the voltage pulse.

Figure 4:
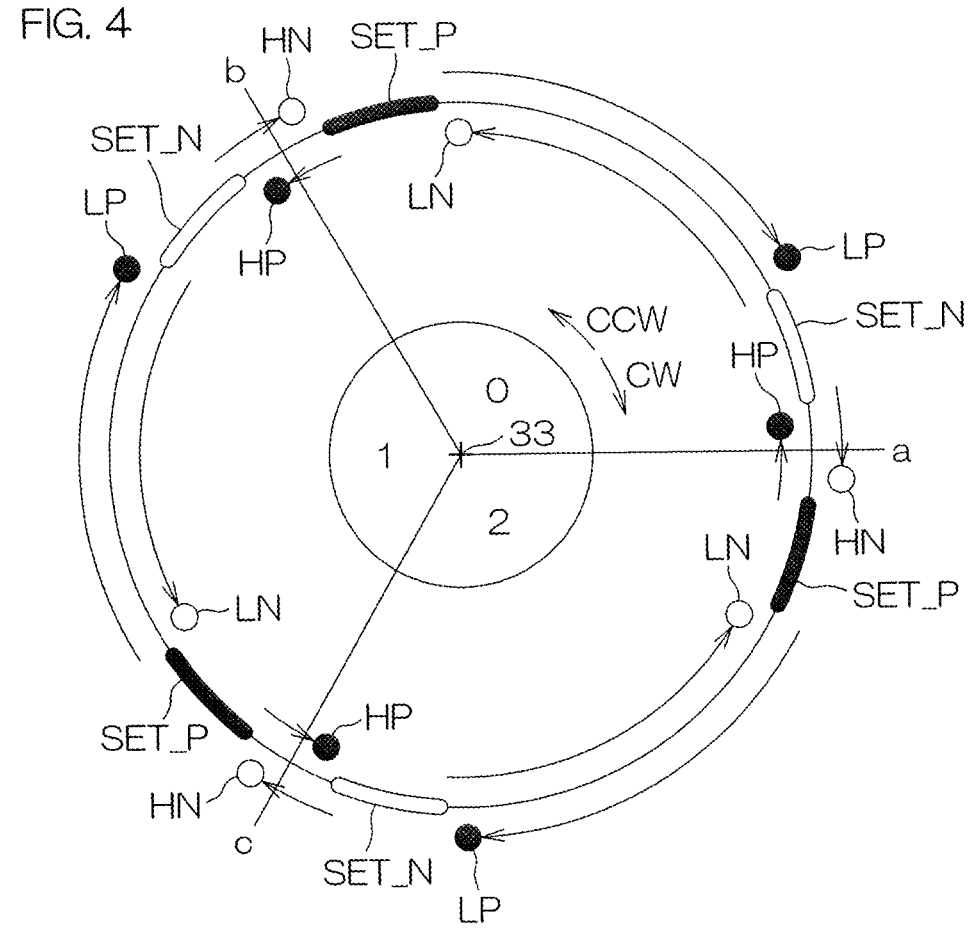
FIG. 4 is a diagram for describing a counting operation to be performed by the segment counter.

FIG. 4 is a diagram for describing an operation to be performed by the segment counter 2. In this example embodiment, the segment counter 2 counts segments defined by equally dividing the angular range into $U_m$ (wherein $U_m$ is an integer not smaller than 3) about the rotation axis 33, and generates a count value indicating the result of the counting. In the example shown in FIG. 4, $U_m=3$, and three segments are defined by three boundaries a, b, c set at an angular interval of 120 degrees about the rotation axis 33. The count value of the segment counter 2 is changed in response to a voltage pulse generated by the power generation sensor 20 at the boundaries a, b, c. Specifically, the boundary a corresponds to a position at which the magnetic pole n1 is opposed to the middle portion of the power generation sensor 20, and the boundary b corresponds to a position at which the magnetic pole n2 is opposed to the middle portion of the power generation sensor 20. The boundary c corresponds to a position at which the magnetic pole n3 is opposed to the middle portion of the power generation sensor 20. The segment counter 2 counts up when the magnetic pole n1, n2, n3 is moved in the counterclockwise direction CCW across the position at which the magnetic pole n1, n2, n3 is opposed to the middle portion of the power generation sensor 20, and counts down when the magnetic pole n1, n2, n3 is moved in the clockwise direction CW across the position at which the magnetic pole n1, n2, n3 is opposed to the middle portion of the power generation sensor 20.

Since the magnetic pole n1, the magnetic pole n2 and the magnetic pole n3 are arranged circumferentially equidistantly, the boundary a, the boundary b and the boundary c are arranged at a rotation angle interval of 120 degrees. If the boundary a is present at a reference angle of 0 degree, the boundary b is present at an angle of 120 degrees and the boundary c is present at an angle of 240 degrees. In this example embodiment, the segment counter 2 is designed so as to count up when the rotation angle is moved across the boundary a, b, c in the counterclockwise direction CCW, and to count down when the rotation angle is moved across the boundary a, b, c in the clockwise direction CW. In the following description, accordingly, an angle value defined about the rotation axis 33 increases as measured in the counterclockwise direction CCW with reference to the boundary a.

The magnetic field generation source 50 is configured to generate a k-cycle alternating magnetic field (k=3 in the illustrated example) while the rotation shaft 30 makes one turn about the rotation axis 33. In this example embodiment, more specifically, the k magnetic poles n1, n2, . . . , nk are arranged equiangularly about the rotation axis 33.

The meanings of characters shown in FIG. 4 are as follows. "H" is a state value indicating a state such that the sensor element MS detects any one of the magnetic poles n1, n2, . . . , nk, i.e., a state such that any one of the magnetic poles n1, n2, . . . , nk is opposed to the middle portion of the power generation sensor 20. "L" is a state value indicating a state such that the sensor element MS detects none of the magnetic poles n1, n2, . . . , nk, i.e., a state such that none of the magnetic poles n1, n2, n3 . . . , nk is opposed to the middle portion of the power generation sensor 20. These state values correspond to the magnetic detection data generated based on the output of the sensor element MS by the signal processing circuit 7. "P" is a pulse polarity value indicating the generation of the positive pulse by the power generation sensor 20. "N" is a pulse polarity value indicating the generation of the negative pulse by the power generation sensor 20. These pulse polarity values correspond to the polarity determination data generated based on the output of the signal evaluation circuit 5 by the signal processing circuit 7.

A state value to be supplied from the signal processing circuit 7 to the counter circuit 8 is represented by a combination of the aforementioned values, and is updated and stored in the nonvolatile memory 9 every time the power generation sensor 20 generates a pulse. "HP" is a state value indicating a state such that a positive pulse is generated with any one of the magnetic poles n1, n2, . . . , nk opposed to the middle portion of the power generation sensor 20. "LN" is a state value indicating a state such that a negative pulse is generated with none of the magnetic poles opposed to the middle portion of the power generation sensor 20. "HN" is a state value indicating a state such that a negative pulse is generated with any one of the magnetic poles opposed to the middle portion of the power generation sensor 20. "LP" is a state value indicating a state such that a positive pulse is generated with none of the magnetic poles opposed to the middle portion of the power generation sensor 20.

"SET_P" indicates an angular range for the preparatory state (set state) for the positive pulse generation. "SET_N" indicates an angular range for the preparatory state (set state) for the negative pulse generation.

Basic operations to be performed by the segment counter 2 are as follows:

When the rotation shaft 30 is rotated in the counterclockwise direction CCW, one negative pulse and one positive pulse are sequentially generated around the boundaries a, b, c corresponding to rotation angles of 0 degree, 120 degrees and 240 degrees by the operation of the power generation sensor 20 shown in FIGS. 3A to 3F. At this time, the state is changed as follows: the state value LN (negative pulse generation)→the set state SET_P→the state value HP (positive pulse generation)→the set state SET_N. The segment counter 2 counts up by +1 with the state value HP. That is, the segment counter 2 counts up by +1 when the rotation angle is increased over 0 degree (at the boundary a), 120 degrees (at the boundary b) and 240 degrees (at the boundary c).

When the rotation shaft 30 is rotated in the clockwise direction CW, the operation of the power generation sensor 20 around the boundaries a, b, corresponding to rotation angles of 0 degree, 120 degrees and 240 degrees is such that the movement direction of the magnetic poles is reversed from that shown in FIGS. 3A to 3F. Thus, one positive pulse and one negative pulse are sequentially generated. At this time, the state is changed as follows: the state value LP (positive pulse generation)→the set state SET_N→the state value HN (negative pulse generation)→the set state SET_P. The segment counter 2 counts down by −1 at the state value HN. That is, the segment counter 2 counts down by −1 when the rotation angle is reduced below 0 degree (at the boundary a), 120 degrees (at the boundary b) and 240 degrees (at the boundary c).

FIG. 5 is a table for describing the counting operation to be performed by the segment counter 2 in greater detail by way of example. The counter circuit 8 incorporated in the counter memory IC 10 performs the counting operation according to the logic based on the table. When the power generation sensor 20 generates a pulse, the state value inputted to the counter circuit 8 from the signal processing circuit 7 is updated. The counting operation (Count) is determined by a combination of the updated state value (NEW) and the preceding state value (OLD). The counter circuit 8 reads out the preceding state value (OLD) from the nonvolatile memory 9, and performs the counting operation by using the preceding state value.

When the updated state value is HP, the counting operation is a +1 counting-up operation if the preceding state value is HN, LP or LN (i.e., other than HP). When the updated state value is HN, the counting operation is a −1 counting-down operation if the preceding state value is HP, LP or LN (i.e., other than HN).

When the updated state value is LP, the counting operation is the −1 counting-down operation only if the preceding state value is HP. When the updated state value is LN, the counting operation is the +1 counting-up operation only if the preceding state value is HN. These counting operations are exceptional counting operations to be performed only when the output of the sensor element MS is changed from the magnetic pole detection state to the magnetic pole non-detection state and the pulse polarity is not changed, and are each intended to be performed for compensation for the influence of pulse missing to be described later.

For changes in state value other than those described above (others), the count value is kept unchanged (a change in count value is 0). That is, the count value is kept unchanged, if the latest state value is equal to the preceding state value, if the latest state value is LP and the preceding state value is HN or LN, or if the latest state value is LN and the preceding state value is HP or LP.

Thus, the counter circuit 8 operates to detect the rotation direction and the rotational position of the rotation shaft 30 based on the state value, i.e., by using the output signal of the sensor element MS and the voltage pulse generated by the power generation sensor 20, and to update the count value and write the updated count value in the nonvolatile memory 9.

Figure 6:
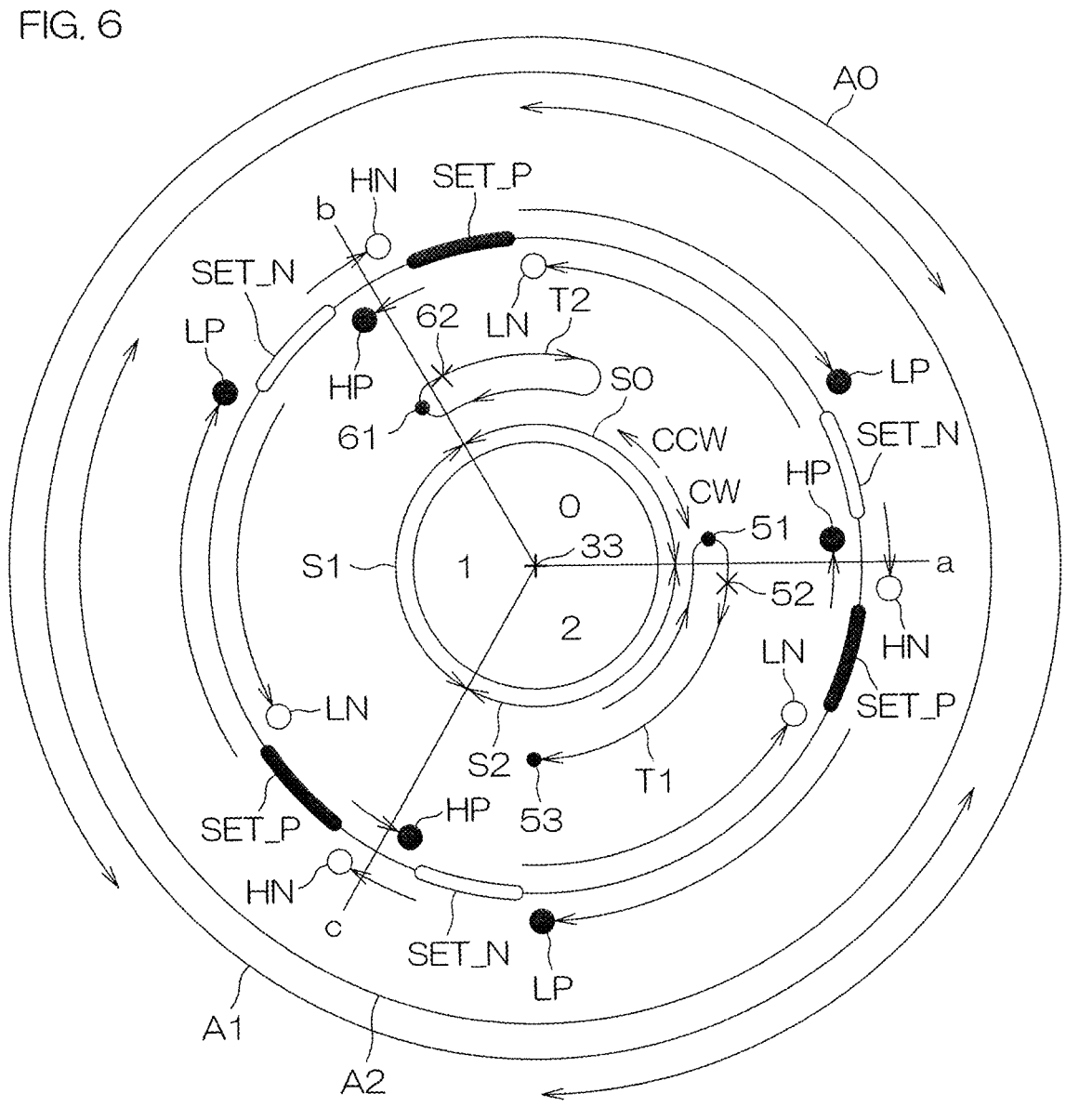
FIG. 6 is a diagram for describing how pulse missing influences a count value.

FIG. 6 is a diagram for describing the influence of the pulse missing on the count value.

Consideration will be given to a case in which the rotation angle is moved along a path T1. If the rotation angle is moved across the boundary a in the counterclockwise direction CCW whereby a positive pulse is generated at a position 51, the state value is changed to HP (see FIG. 3E). If the rotation direction is reversed before the rotation angle reaches a position (see FIG. 3F) at which the stabilization magnetic field is applied to the magnetic wire FE of the power generation sensor 20, the magnetic wire FE is not brought into the negative pulse generation preparatory state (SET_N) but the rotation angle is moved across the boundary a in the clockwise direction CW to reach a position 52 at which the state value is to be changed to HN. At this time, no negative pulse is generated at the position 52 (pulse missing) and, therefore, the state value is not updated. If the magnetic wire FE is thereafter brought into the positive pulse generation preparatory state (SET_P) by further rotation in the clockwise direction CW and the rotation angle reaches a position 53, a negative pulse is generated, and the state value is changed to LP. If the state value were changed from HP to HN, therefore, the counting operation should have been basically the −1 counting-down operation. Actually, however, the state value is changed from HP to LP, so that the exceptional −1 counting-down operation is performed (see FIG. 5). This compensates for the influence of the pulse missing. Where the rotation direction is opposite to that described above, a similar behavior is observed. Therefore, the state value is changed from HN to LN, and the exceptional +1 counting-up operation is performed (see FIG. 5). Until either of these exceptional counting operations is performed, the count value may contain an error of +1.

Next, consideration will be given to a case in which the rotation angle is moved along a path T2. That is, the rotation angle is moved across the boundary b in the counterclockwise direction CCW, whereby a positive pulse is generated at a position 61 and the state value is changed to HP. If the rotation direction is reversed before the rotation angle reaches a position (see FIG. 3F) at which the stabilization magnetic field is applied to the magnetic wire FE of the power generation sensor 20, the magnetic wire FE is not brought into the negative pulse generation preparatory state (SET_N) but the rotation angle is moved across the boundary b in the clockwise direction CW to reach a position 62 at which the state value is to be changed to HN. At this time, no negative pulse is generated at the position 62 (pulse missing) and, therefore, the state value is not updated. Thereafter, the magnetic wire FE is brought into the positive pulse generation preparatory state (SET_P) by further rotation in the clockwise direction CW. If the rotation direction is reversed again, the rotation angle is moved across the boundary b in the counterclockwise direction CCW, whereby a positive pulse is generated again at the position 61 and the state value is HP. If the state value were changed from HP to HN, therefore, the counting operation should have been basically the −1 counting-down operation. Actually, however, the state value is changed from HP to HP, so that the count value is not changed ("others" in FIG. 5). That is, the state value change is HP→HP, but the rotation angle is at the same position. Therefore, no counting operation is performed. In the scenario of the path T2, the count value of the segment counter 2 may contain an error of +1 during a period from the generation of the second state value HP to the ignorance of the count. Where the rotation direction is opposite to that described above, a similar behavior is observed. The state value change is HN→HN, and the count value is not changed (see FIG. 5). In this case, the count value may contain an error of −1. Therefore, the count value may contain an error of +1 until the exceptional counting operation is performed.

It is herein assumed that, within an angular range of one turn (360 degrees), a correct count value is 0 in a zone S0 between the boundaries a and b (0 degree to 120 degrees), is 1 in a zone S1 between the boundaries b and c (120 degrees to 240 degrees), and is 2 in a zone S2 between the boundaries b and c (240 degrees to 360 degrees). In this case, angular ranges A0, A1 and A2 for which the count value can be 0, 1 and 2, respectively, as determined in consideration of the count errors described above, are as shown in FIG. 6. The angular ranges A0, A1, A2 are greater than the angular ranges (120 degrees) of the respective zones S0, S1, S2, but are smaller than one turn (360 degrees) as shown in FIG. 6. Since overlapping parts of the angular ranges A0, A1, A2 do not extend over plural turns, the number of turns can be determined on a single-turn basis by using the count value and the angle detection value. Specifically, the angular ranges A0, A1 and A2 for which the count value can be 0, 1 and 2, respectively, do not extend beyond the zones S2 and S1 adjacent to the zone S0, beyond the zones S0 and S2 adjacent to S1, and beyond the zones S1 and S0 adjacent to S2.

In this example embodiment, the counter circuit 8 is configured so that, when the k-cycle alternating magnetic field is applied per each turn to the magnetic wire FE to thereby generate 2k pulses, the counting operation is performed k times by way of example. In this case, the segment number $U_m$ per each turn is k by way of example. Alternatively, it may be possible to use a counter circuit configured to perform the counting operation 2k times during the generation of 2k pulses per each turn (i.e., the +1 counting operation or the −1 counting operation according to the pulse generation). In this case, the segment number Um per each turn is 2k. Where the same state value is continuously generated, the count value is maintained, and a +2 or −2 count correcting operation may be performed for pulse missing. The segment number Um may be other than k and 2k.

Figure 7:
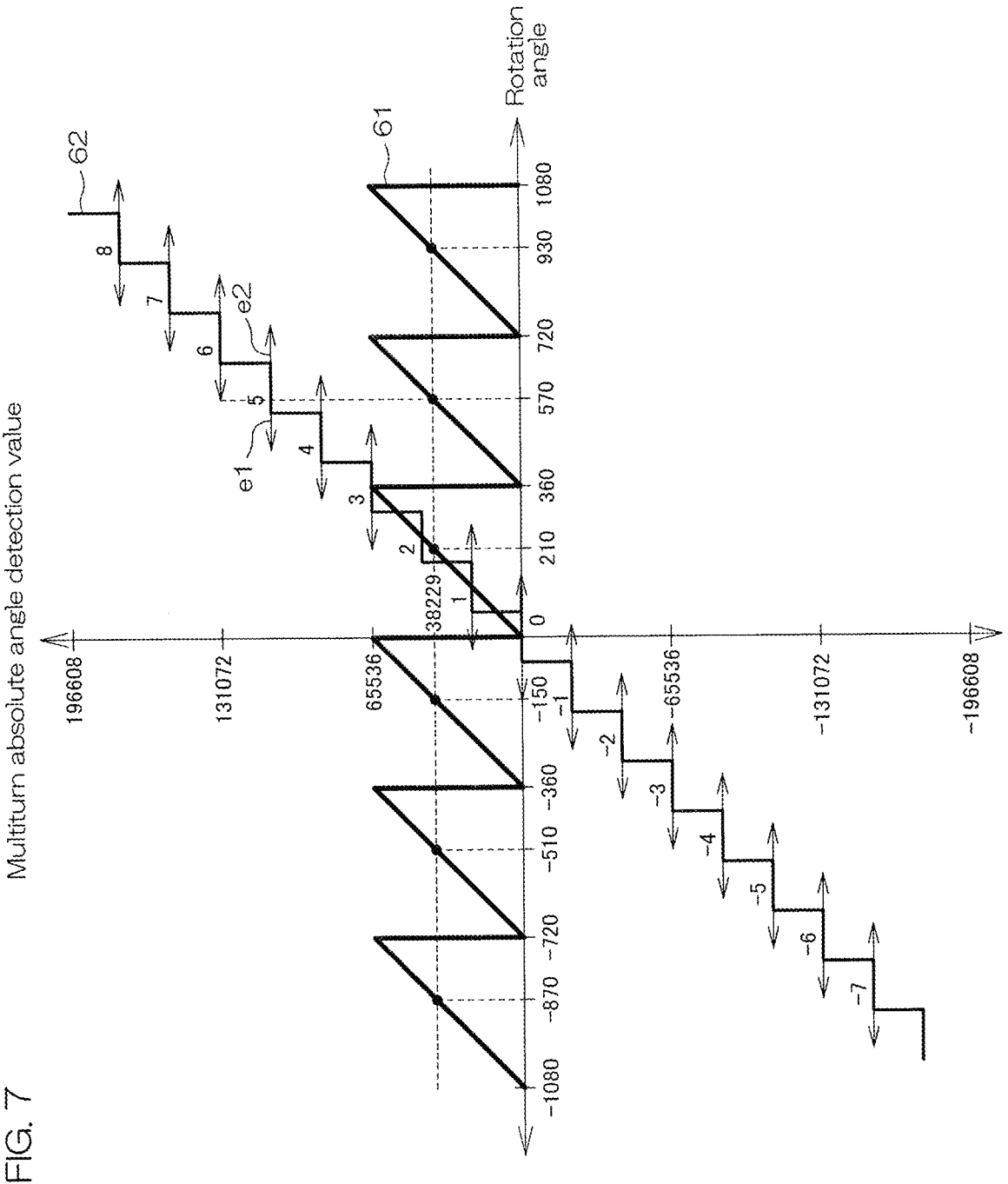
FIG. 7 shows a relationship between the count value of the segment counter and the angle detection value of the precision absolute angle detector.

FIG. 7 shows a relationship between the count value of the segment counter 2 and the angle detection value of the precision absolute angle detector 1. The abscissa indicates the rotation angle (degrees) of the rotation shaft 30, and the ordinate indicates the multiturn absolute angle value. The one turn (360 degrees) is expressed at a resolution of 16 bits (65536 steps). However, a precondition for this is that the segment number is $U_m$=k=3. As described above, $U_m$=k is not necessarily required, but the segment number Um may be any divisor (not smaller than 2) of the number of pulses (2k) generated per each turn by the power generation sensor 20, and is preferably a divisor not smaller than 3.

As the rotation shaft 30 is rotated, the angle detection value of the precision absolute angle detector 1 is changed between 0 and 65536 in a serration form as indicated by a reference character 61.

On the other hand, as indicated by a reference character 62, the count value of the segment counter 2 is ideally changed stepwise as the rotation shaft 30 is rotated. It is ideal that count values for 120 degree angular ranges (=360 degrees/3) respectively having medians spaced 120 degrees (=360 degrees/3) from each other with respect to a reference angle of 0 degree are, for example, . . . , −3, −2, −1, 0, 1, 2, 3, . . . . Since the count of the segment counter 2 is 3 per each turn, a step level per each count is $65536/3$.

Actually, there is a possibility that, where the count value of the segment counter 2 contains an error as described above, the same count value is generated in error zones e1, e2 present on the opposite sides of each count value zone. In PTL 2, the magnetization state determining process is performed when the external power source is turned on, and the count value of the segment counter is corrected and synchronized with the angle detection value of the precision absolute angle detector for the elimination of the error zones. In this example embodiment, the count value of the segment counter 2 is combined with the angle detection value of the precision absolute angle detector 1 by using the error-containing count value of the segment counter 2 as it is without performing the process for the correction and the synchronization.

Specifically, as shown in FIG. 7, the count values of the segment counter 2 to be observed when the angle detection value of the precision absolute angle detector 1 is a certain value (e.g., 38299 which corresponds to 210 degrees in an angular range within one turn (0 degree to 360 degrees)) will be checked. In an angular range of multiple turns, the precision absolute angle detector 1 provides an angle detection value of 38299 (210 degrees) at multiturn angles spaced 360 degrees from each other with respect to a reference angle of 210 degrees. That is, the multiturn angles are . . . , −870 degrees, −510 degrees, −150 degrees, 210 degrees, 570 degrees, 930 degrees, . . . In consideration of the count errors, possible values to be taken as the count value of the segment counter 2 for these multiturn angles are shown in the following table:

TABLE 1

| Multiturn angle | Count value |
|---|---|
| . . . | . . . |
| −870 degrees | −8, −7 or −6 |
| −510 degrees | −5, −4 or −3 |
| −150 degrees | −2, −1 or 0 |

TABLE 1-continued

| Multiturn angle | Count value |
| --- | --- |
| 210 degrees | 1, 2 or 3 |
| 570 degrees | 4, 5 or 6 |
| 930 degrees | 7, 8 or 9 |
| . . . | . . . |

Figure 8:
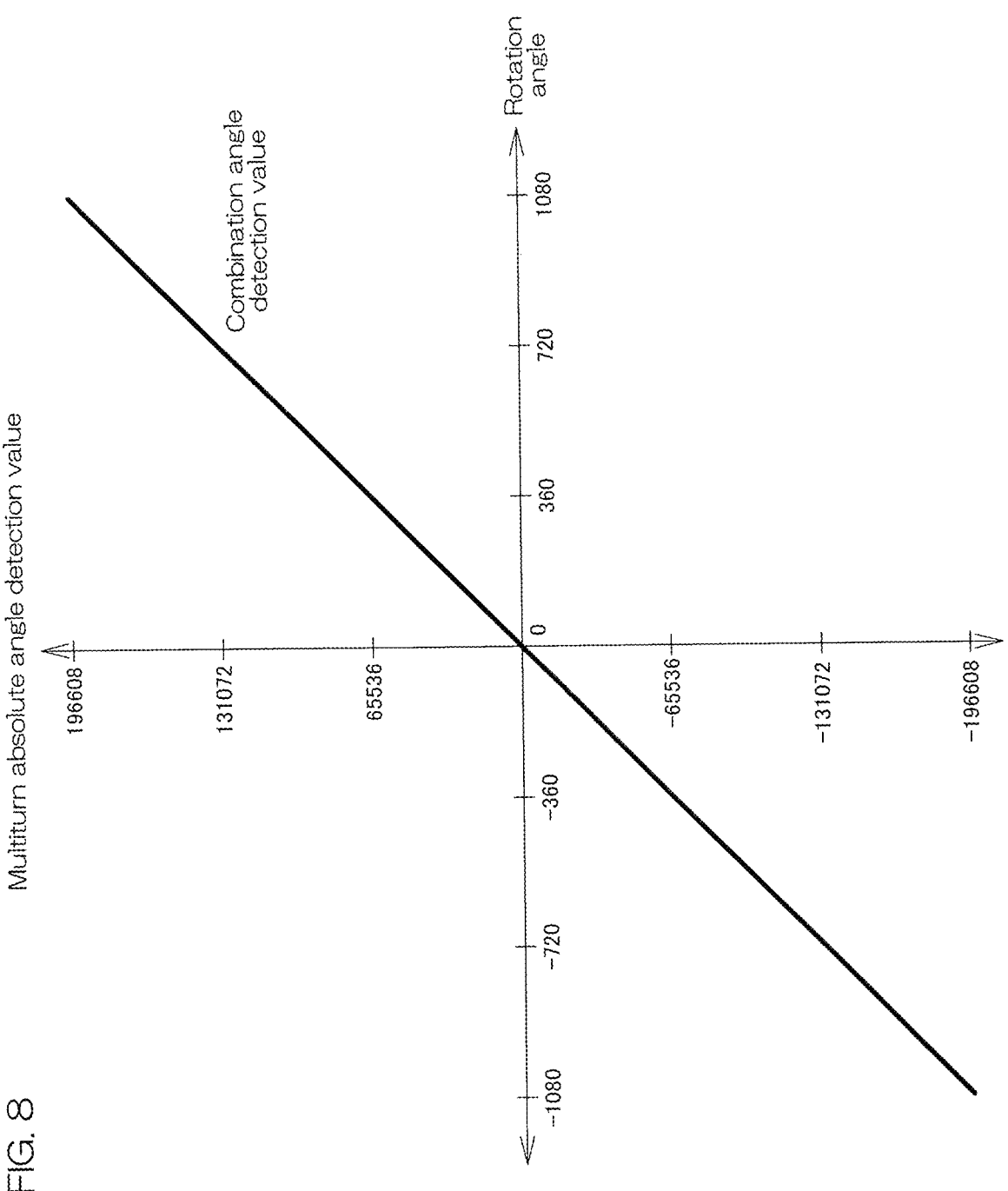
FIG. 8 shows a precise multiturn absolute angle detection value obtained by combining the count value of the segment counter with the angle detection value of the precision absolute angle detector.

Since the count values of the segment counter 2 each possibly cover an angular range of smaller than 360 degrees even in consideration of the errors, the same count value is not duplicately provided for different multiturn angles. Therefore, the multiturn absolute angle detection value can be uniquely determined by a combination of the count value of the segment counter 2 and the angle detection value detected by the precision absolute angle detector 1. Therefore, as shown in FIG. 8, the multiturn absolute angle detection value can be generated by combining the count value of the segment counter 2 with the angle detection value detected by the precision absolute angle detector 1 without correcting the count error of the segment counter 2 and synchronizing the count value with the angle detection value.

The arithmetic device 4 computes the multiturn absolute angle detection value θmt, for example, by combining the count value m of the segment counter 2 with the angle detection value θ of the precision absolute angle detector 1 through the following computation with the use of the count value m of the segment counter 2 and the angle detection value θ of the precision absolute angle detector 1. FIG. 8 described above shows the result of the computation. In the following expression, N indicates the number of turns (rotation amount) from the reference point (rotational position origin) of the rotation shaft 30. $U_\theta$ indicates an angle detection amount per each turn (e.g., $U_\theta$=65536 (based on 16 bits), and corresponds to the resolution of the precision absolute angle detector 1. Further, $U_m$ (e.g., $U_m$=k=3) is the number of segments per each turn, and corresponds to the number of counts of the segment counter 2 per each turn.

$$\theta mt = N \times U_\theta + \theta \qquad \text{[Expression 1]}$$
$$N = \text{INT}(m/U_m - \theta/U_\theta + 1/2)$$

As indicated by the above expression, the number N of turns can be determined by dividing the count value m by the segment number $U_m$ for conversion to the number of turns, subtracting the rotation amount ($\theta/U_\theta$) corresponding to the angle detection value θ from the number of turns, and rounding the subtraction result. In the above expression, ½ is added to the subtraction result, and a rounding computation is performed by an integerization function INT (a function of rounding off a decimal part for the integerization).

The number N of turns thus determined is multiplied by the angle detection amount $U_\theta$ per each turn, whereby the multiturn angle detection value can be determined for the count value m of the segment counter 2. The multiturn absolute angle detection value θmt indicating the precise multiturn absolute angle can be determined by adding the precise angle detection value θ within the single turn to the multiturn angle detection value.

A table preliminarily prepared may be used, as required, to perform a part or all of the aforementioned computation in the arithmetic device 4.

In the actual computation of the number N of turns, it is convenient to use the following expression equivalent to the above expression so as to avoid the handling of the decimal part.

$$N = \text{INT}\left\{\left(\frac{mU_\theta}{U_m} - \theta + \frac{U_\theta}{2}\right)/U_\theta\right\} \qquad \text{[Expression 2]}$$

In this example embodiment, as described above, the segment counter 2 includes the sole power generation sensor 20 and the sensor element MS, and is configured so as to apply the three or more-cycle alternating magnetic field per each turn to the magnetic wire of the power generation sensor 20. The count value of the segment counter 2 having such a configuration can be handled with some error contained therein, and properly combined with the angle detection value generated by the precision absolute angle detector 1 to thereby provide the precise multiturn absolute angle detection value. This eliminates the need for the use of the plurality of power generation sensors 20, for the determination of the magnetization direction of the magnetic wire FE of the power generation sensor 20 and for the complicated correcting process and the synchronizing process based on the magnetization direction of the magnetic wire FE. Therefore, the precision multiturn absolute angle detection device can be provided, which has a smaller size and lower costs with a simplified configuration and yet has a higher resolution.

Figures 9A, 9B:
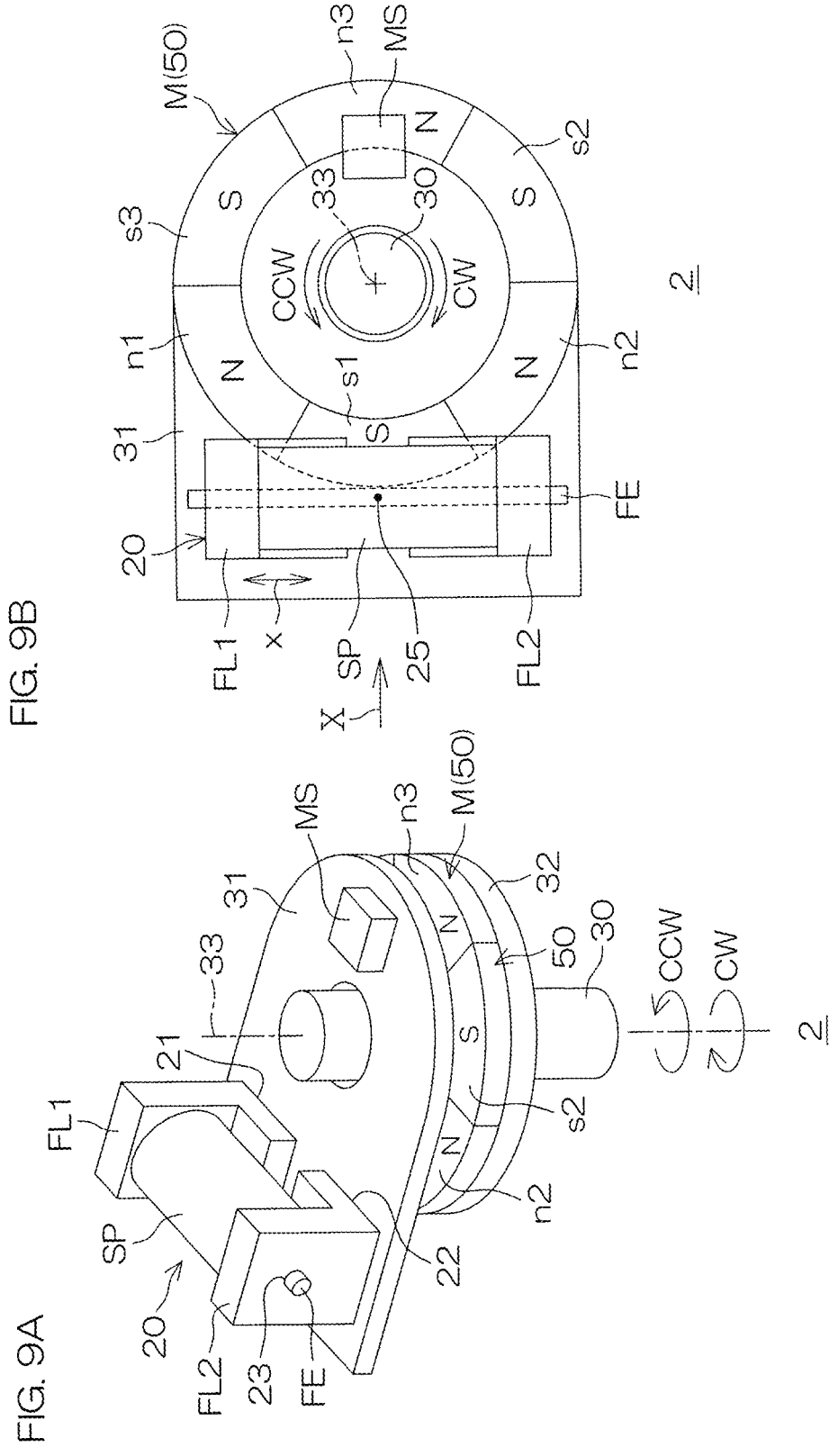
FIG. 9A is a perspective view that describes the structure of a segment counter according to another example embodiment of the present invention by way of example.
FIG. 9B is a plan view of the segment counter.

FIG. 9A is a perspective view that describes the structure of a segment counter 2 to be employed for a multiturn angle detection device according to another example embodiment of the present invention by way of example, and FIG. 9B is a plan view of the segment counter 2. In FIGS. 9A and 9B, components corresponding to those shown in FIGS. 2A, 2B and 2C will be denoted by the same reference characters as in FIGS. 2A, 2B and 2C.

In this example embodiment, the segment counter 2 having the structure shown in FIGS. 9A and 9B are used in the multiturn angle detection device 100 having the configuration shown in FIG. 1. In comparison with the example embodiment described above, the configuration of the magnetic field generation source 50 is mainly different. In addition, the layout of the sensor element MS is different. The first support 31 that supports the power generation sensor 20 is modified according to the layout of the sensor element MS so as to support the sensor element MS. The layout of the magnetic field generation source 50 is shown in FIG. 9B as seen through the first support 31. The segment counter 2 has substantially the same structure as in the example embodiment described above except for that described above.

In this example embodiment, the magnetic field generation source 50 is constituted by a ring-shaped six-pole magnetization magnet M surrounding the rotation axis 33. The magnetization direction is parallel to the rotation axis 33. The six-pole magnetization magnet M is configured, as seen along the rotation axis 33 from one side, so that k magnetic pole pairs (k pairs of N-poles and S-poles) (wherein k is an integer not smaller than 3 and, in the illustrated example, k=3) are arranged circumferentially about the rotation axis 33, and include k N-poles n1, n2, . . . , nk and k S-poles s1, s2, . . . , sk alternately arranged. The magnetic poles n1, n2, . . . , nk; s1, s2, . . . , sk respectively extend in angular ranges defined about the rotation axis 33 as each having an angle of 360 degrees/2k (60 degrees in this example embodiment). Thus, the second support 32 is rotated together with the rotation shaft 30, and the magnetic field generation source 50 is correspondingly rotated about the rotation axis 33, whereby the k-cycle alternating magnetic field (three-cycle alternating magnetic field in the illustrated example) is applied to the power generation sensor 20.

The magnetic wire FE of the power generation sensor 20 is located on the tangential line of the circle defined about the rotation axis 33, and the axially middle point 25 of the magnetic wire FE is present on the contact point of the tangential line. The power generation sensor 20 is disposed so that, when the middle portion of any one of the magnetic poles n1, n2, . . . , nk; s1, s2, . . . sk extending in the angular ranges defined about the rotation axis 33 and each having an angle of 360 degrees/2k (60 degrees in this example embodiment) coincides with the axially middle point 25 of the magnetic wire FE, magnetic fluxes conducted through the two magnetic flux conducting pieces FL1, FL2 are balanced.

The sensor element MS is disposed so as to detect the polarity of any one of the magnetic poles opposed to the middle portion of the power generation sensor 20. The sensor element MS is, for example, a magnetic sensor such as a Hall IC. The sensor element MS is configured to output an H-signal when detecting any one of the S-poles (with a corresponding one of the N-poles opposed to the middle portion of the power generation sensor 20) and to output an L-signal when detecting any one of the N-poles (with a corresponding one of the S-poles opposed to the middle portion of the power generation sensor 20). Thus, the sensor element MS determines the polarity of the magnetic pole passing through the vicinity of the sensor element MS and, as a result, determines the polarity of the magnetic pole opposed to the middle portion of the power generation sensor 20. In this example embodiment, the sensor element MS is disposed so as to detect one of the magnetic poles at a position having a phase difference of 180 degrees about the rotation axis 33 with respect to the power generation sensor 20, i.e., at a position symmetrical to the power generation sensor 20 about the rotation axis 33. Where k is an odd number (e.g., 3), the sensor element MS detects a magnetic pole having a polarity opposite to that of the magnetic pole opposed to the middle portion of the power generation sensor 20. Where k is an even number (e.g., 4), the sensor element MS detects a magnetic pole having the same polarity as that of the magnetic pole opposed to the middle portion of the power generation sensor 20. In either case, the sensor element MS can detect the polarity of the magnetic pole opposed to the middle portion of the power generation sensor 20.

FIGS. 10A to 10F show an exemplary operation. Consideration will be given to a case in which the rotation shaft 30 is rotated about the rotation axis 33 in the counterclockwise direction CCW (counterclockwise). FIG.

10A is a front view of the state of FIG. 9B as seen in an arrow direction X. FIGS. 10B to 10F are also front views as seen in the same aspect.

Figure 10A:
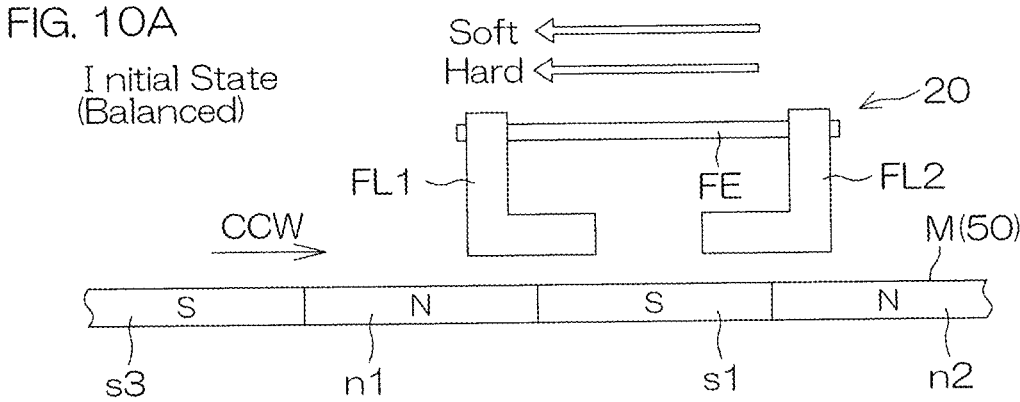
FIGS. 10A, 10B and 10C are diagrams for describing the function of a power generation sensor.

When a state shown in FIG. 10A (FIG. 9B) is reached, the hard layer and the soft layer of the magnetic wire FE are magnetized in a direction extending from the second magnetic flux conducting piece FL2 to the first magnetic flux conducting piece FL1, i.e., a set state for the negative pulse generation (SET_N) is achieved. At this time, the areas of the first magnetic flux conducting piece FL1 opposed to an N-pole and an S-pole are balanced with the areas of the second magnetic flux conducting piece FL2 opposed to an N-pole and the S-pole. In other words, the magnetic field generation source 50, the power generation sensor 20 and the positional relationship of the magnetic field generation source 50 and the power generation sensor 20 are designed so as to achieve such a state.

Figure 10B:
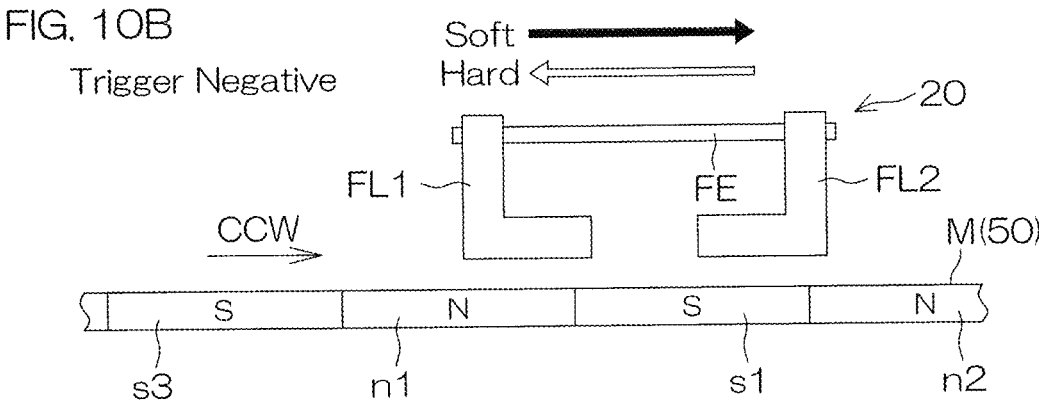

When the magnetic field generation source 50 is slightly rotated together with the rotation shaft 30 in the counterclockwise direction CCW from this state, the proportion of the area of the first magnetic flux conducting piece FL1 opposed to the N-pole is increased, and the proportion of the area of the second magnetic flux conducting piece FL2 opposed to the N-pole is reduced as shown in FIG. 10B. Thus, a magnetic field directed from the first magnetic flux conducting piece FL1 to the second magnetic flux conducting piece FL2 is applied to the magnetic wire FE. When the strength of the magnetic field reaches the operational magnetic field, the magnetization direction of the soft layer is reversed, whereby a negative voltage pulse is generated. At this time, the sensor element MS detects an N-pole (the S-pole is opposed to the middle portion of the power generation sensor 20), so that an L-signal is generated. Therefore, the state value is LN.

Figure 10C:
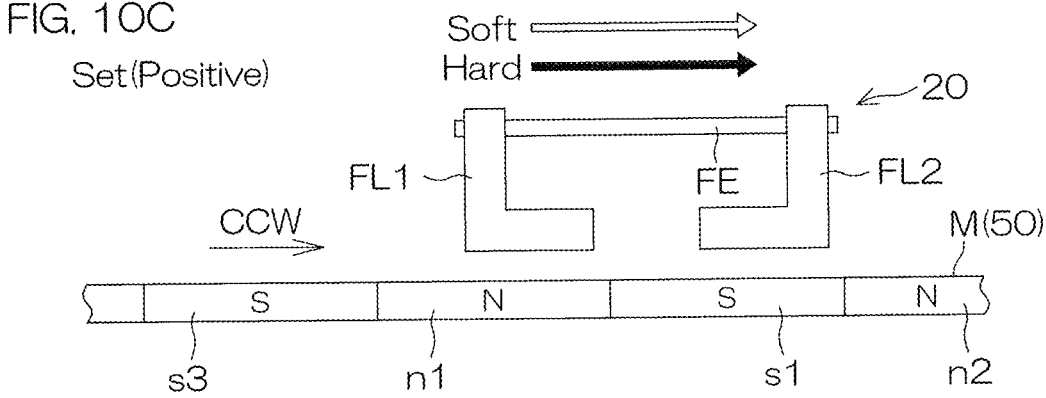

When the rotation shaft 30 is further rotated in the counterclockwise direction CCW, the magnetic field directed from the first magnetic flux conducting piece FL1 to the second magnetic flux conducting piece FL2 is strengthened to reach the stabilization magnetic field, whereby the magnetization direction of the hard layer of the magnetic wire FE is also reversed to achieve the set state for the positive pulse generation (SET_P) as shown in FIG. 10C.

Figure 10D:
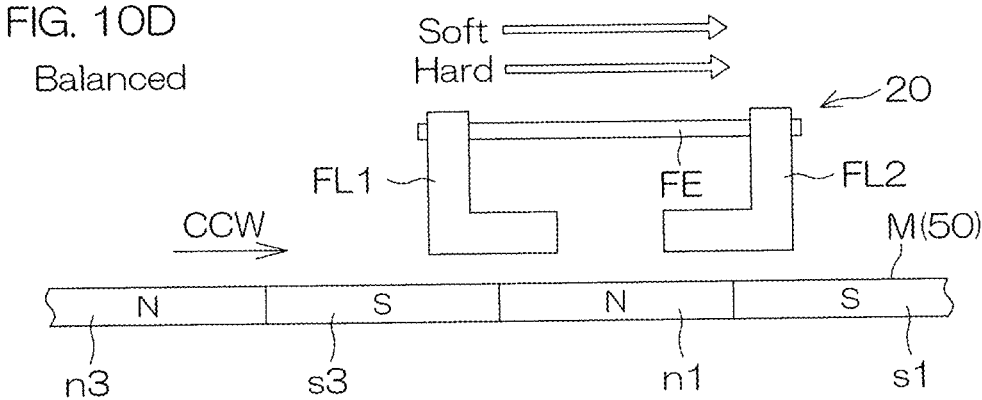
FIGS. 10D, 10E and 10F are diagrams for describing the function of the power generation sensor.

When the rotation shaft 30 is further rotated by 60 degrees in the counterclockwise direction CCW from the state shown in FIG. 10C to a state shown in FIG. 10D, the polarity is reversed, but the power generation sensor 20 operates in the same manner as described above. That is, the hard layer and the soft layer of the magnetic wire FE are magnetized in the direction extending from the first magnetic flux conducting piece FL1 to the second magnetic flux conducting piece FL2. That is, the set state for the positive pulse generation (SET_P) is achieved. At this time, the areas of the first magnetic flux conducting piece FL1 opposed to the N-pole and an S-pole are balanced with the areas of the second magnetic flux conducting piece FL2 opposed to the N-pole and the S-pole.

Figure 10E:
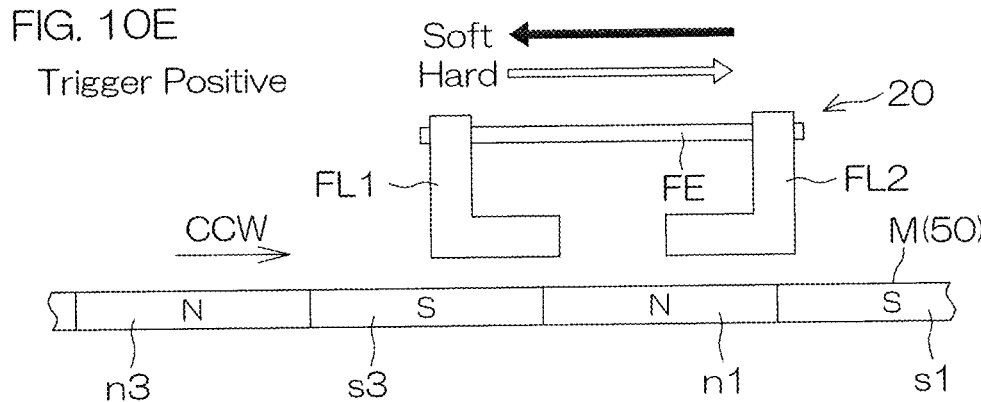

When the magnetic field generation source 50 is slightly rotated together with the rotation shaft 30 in the counterclockwise direction CCW from this state, as shown in FIG. 10E, the proportion of the area of the first magnetic flux conducting piece FL1 opposed to the N-pole is reduced, and the proportion of the area of the second magnetic flux conducting piece FL2 opposed to the N-pole is increased. Thus, a magnetic field directed from the second magnetic flux conducting piece FL2 to the first magnetic flux conducting piece FL1 is applied to the magnetic wire FE. When the strength of the magnetic field reaches the operational magnetic field, the magnetization direction of the soft layer is reversed, whereby the positive voltage pulse is generated. At this time, the sensor element MS detects an S-pole (the N-pole is opposed to the middle portion of the power generation sensor 20), so that an H-signal is generated. Therefore, the state value is HP.

Figure 10F:
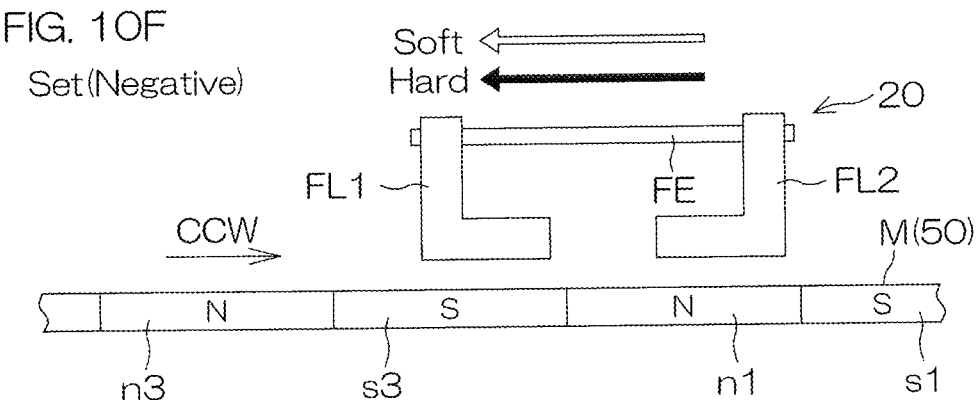

When the rotation shaft 30 is further rotated in the counterclockwise direction CCW, the magnetic field directed from the second magnetic flux conducting piece FL2 to the first magnetic flux conducting piece FL1 is strengthened to reach the stabilization magnetic field, whereby the magnetization direction of the hard layer of the magnetic wire FE is also reversed as shown in FIG. 10F to achieve the set state for the negative pulse generation (SET_N). When the rotation shaft 30 is rotated by 60 degrees in the counterclockwise direction CCW from this state, a state equivalent to that shown in FIG. 10A is achieved.

When one of the magnetic pole pairs thus passes through the detection region of the power generation sensor 20, the two pulses are generated. Since the magnetic field generation source 50 includes the k magnetic pole pairs (the three magnetic pole pairs in this example), 2k pulses (six pulses in this example) are generated per each turn.

Figure 11:
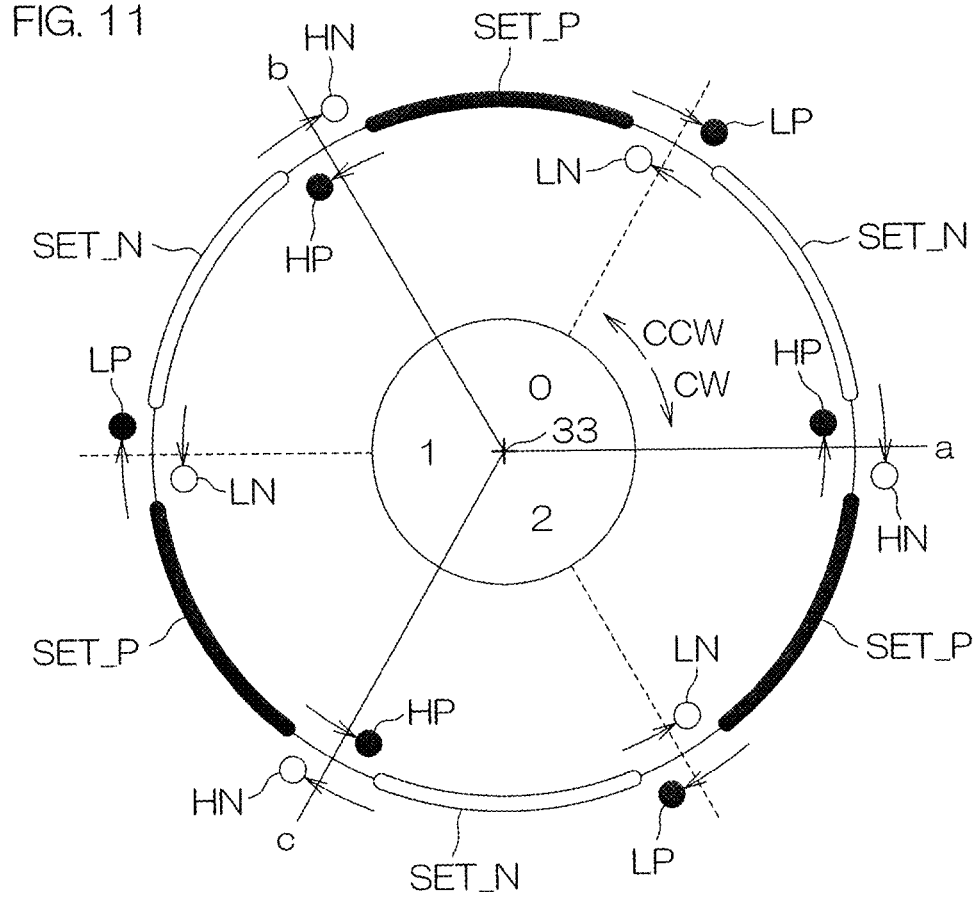
FIG. 11 is a diagram for describing a counting operation to be performed by the segment counter.

Similar consideration given to the rotation in the clockwise direction CW indicates that the segment counter 2 operates as shown in FIG. 11. In comparison with FIG. 4, angular positions with the state values LN, LP are different, but substantially the same counting operation as in the example embodiment described above can be performed by employing the counting method shown in FIG. 5 as it is. Therefore, the count value of the segment counter 2 is combined with the angle detection value of the precision absolute angle detector 1 to generate the precise multiturn absolute angle detection value by performing the same signal processing as in the example embodiment described above. The segment boundaries a, b, c, i.e., the boundaries at which the count value is changed, each correspond to an angular position such that one of the N-poles and the S-poles of the magnetic pole pairs is opposed to the middle portion of the power generation sensor 20.

While the example embodiments of the present invention have thus been described, the present invention may be embodied in some other ways as will be described by way of example.

In the example embodiment described above, the power generation sensor 20 including the L-shaped magnetic flux conducting pieces FL1, FL2 are used by way of example, but the magnetic flux conducting pieces may each have a different shape. For example, I-shaped magnetic flux conducting pieces each extending linearly from the magnetic wire FE toward the detection region may be used. Further, tubular magnetic flux conducting pieces each having substantially the same size as the coil may be provided on the opposite sides of the magnetic wire.

In the example embodiment described above, the magnetic field generation source 50 mainly described includes the three magnets (see FIG. 2A) or the three magnetic pole pairs (see FIG. 9A). Alternatively, the magnetic field generation source 50 may include four or more magnets or four or more magnetic pole pairs, and the segment counter may include four or more segments.

Further, the precision absolute angle detector 1 does not necessarily mean a single detector, but may be merely required to function to measure an absolute angle within a single turn. For example, the precision absolute angle detector 1 may include a plurality of detectors each having a detection range of not greater than a single turn. For example, an angle based on 1 cycle/turn may be determined through computation by using the detection signal of a detector based on 32 cycles/turn and the detection signal of a detector based on 31 cycles/turn. Even in this case, the computation may be performed by the arithmetic device 4.

While the present invention has been described in detail by way of the example embodiments thereof, it should be understood that these example embodiments are merely illustrative of the technical principles of the present invention but not limitative of the invention. The scope of the present invention is to be limited only by the appended claims.

DESCRIPTION OF REFERENCE CHARACTERS

1: Precision absolute angle detector
2: Segment counter
3: Power supply circuit
4: Arithmetic device
5: Signal evaluation circuit
6: Rectification/power supply circuit
7: Signal processing circuit
8: Counter circuit
9: Nonvolatile memory
10: Counter memory IC
20: Power generation sensor
30: Rotation shaft
31: First support
32: Second support
33: Rotation axis
50: Magnetic field generation source
100: Multiturn angle detection device
FE: Magnetic wire
FL1: First magnetic flux conducting piece
FL2: Second magnetic flux conducting piece
M: Six-pole magnetization magnet
M1, M2, M3: Magnets
MS: Sensor element
SP: Coil
SR: Detection region
n1, n2, n3: N-poles
s1, s2, s3: S-poles

The invention claimed is:

1. A multiturn angle detection device to generate a multiturn absolute angle detection value of a rotating body that is rotated about a rotation axis, the multiturn angle detection device comprising:

a segment counter to generate a count value according to the rotation of the rotating body by counting segments defined by dividing a single-turn cycle of the rotating body in an angular range over a single turn of the rotating body;

a precision absolute angle detector, operative with external electric power supply, to generate an absolute angle detection value within the single-turn cycle of the rotating body at a resolution higher than the segments; and an arithmetic device, operative with the external electric power supply, to generate the multiturn absolute angle detection value of the rotating body by combining the count value of the segment counter with the absolute angle detection value of the precision absolute angle detector;

wherein the segment counter includes a single power generation sensor, a magnetic field generation source to be rotated together with the rotating body about the rotation axis, a sensor element different from the power generation sensor, and a nonvolatile memory to store the count value;

wherein the power generation sensor includes a magnetic wire that exhibits a large Barkhausen effect, and a coil wound around the magnetic wire, and generates a voltage pulse according to a magnetic field change occurring due to the rotation of the magnetic field generation source;

wherein the magnetic field generation source applies a k-cycle alternating magnetic field (wherein k is an integer not smaller than 3) per each turn of the rotating body axially of the magnetic wire;

wherein the segment counter is operative with an energy of the voltage pulse generated by the power generation sensor without receiving the external electric power supply, and is to detect a rotation direction and a rotational position of the rotating body by using the voltage pulse generated by the power generation sensor and an output signal of the sensor element to update the count value, and to store the updated count value in the nonvolatile memory;

wherein the arithmetic device uses the count value stored in the nonvolatile memory as it is when receiving the external electric power supply, and generates the multiturn absolute angle detection value of the rotating body by combining the count value of the segment counter with the absolute angle detection value of the precision absolute angle detector.

2. The multiturn angle detection device according to claim 1, wherein the magnetic field generation source includes k magnets arranged on a circle defined about the rotation axis with their magnetic poles of the same polarity to be opposed to the power generation sensor, wherein the magnetic wire of the power generation sensor is disposed parallel to a tangential line of the circle, wherein the power generation sensor includes a first magnetic flux conducting piece and a second magnetic flux conducting piece respectively magnetically coupled to opposite end portions of the magnetic wire, wherein the magnetic poles are sequentially moved closer to the first magnetic flux conducting piece and the second magnetic flux conducting piece, as the magnetic field generation source is rotated, wherein the power generation sensor generates a negative voltage pulse in a first state in which a magnetic flux from any one of the magnetic poles of the magnetic field generation source is conducted through the first magnetic flux conducting piece, and generates a positive voltage pulse in a second state in which the magnetic flux from the magnetic field generation source is conducted through the second magnetic flux conducting piece.

3. The multiturn angle detection device according to claim 1, wherein the sensor element detects whether or not any one of the magnetic poles of the magnetic field generation source is present at a position opposed to a middle portion of the power generation sensor, and boundaries between the segments each define an angular position such that the one magnetic pole is opposed to the middle portion of the power generation sensor.

4. The multiturn angle detection device according to claim 1, wherein the magnetic field generation source includes k pairs of magnetic poles disposed on a circle defined about the rotation axis with their N-poles and S-poles alternately arranged.

5. The multiturn angle detection device according to claim 4, wherein the magnetic wire of the power generation sensor is located on a tangential line of a circle defined about the rotation axis with its middle point located at a contact point on the tangential line.

6. The multiturn angle detection device according to claim 4, wherein the sensor element detects a polarity of any one of the magnetic poles opposed to a middle portion of the power generation sensor, and boundaries between the segments each define an angular position such that one of the N-poles and the S-poles of the magnetic pole pairs is opposed to the middle portion of the power generation sensor.

* * * * *